United States Patent [19]
Sturges

[11] Patent Number: 5,930,827
[45] Date of Patent: Jul. 27, 1999

[54] METHOD AND APPARATUS FOR DYNAMIC MEMORY MANAGEMENT BY ASSOCIATION OF FREE MEMORY BLOCKS USING A BINARY TREE ORGANIZED IN AN ADDRESS AND SIZE DEPENDENT MANNER

[75] Inventor: Jay J. Sturges, Orangevale, Calif.

[73] Assignee: Intel Corporation, Santa Clara, Calif.

[21] Appl. No.: 08/759,049

[22] Filed: Dec. 2, 1996

[51] Int. Cl.⁶ .................................................. G06F 12/00
[52] U.S. Cl. ........................ 711/170; 395/800.14; 711/5; 711/171
[58] Field of Search ........................... 395/800.14; 711/5, 711/170, 1, 100, 171

[56] References Cited

U.S. PATENT DOCUMENTS

| | | | |
|---|---|---|---|
| 3,544,976 | 12/1970 | Collins | 340/172.5 |
| 4,491,836 | 1/1985 | Collmeyer et al. | 340/747 |
| 4,492,956 | 1/1985 | Collmeyer et al. | 340/723 |
| 4,496,944 | 1/1985 | Collmeyer et al. | 340/723 |
| 5,189,733 | 2/1993 | Bennett et al. | 395/650 |
| 5,193,202 | 3/1993 | Jackson et al. | 395/800 |
| 5,339,397 | 8/1994 | Eikill et al. | 395/400 |
| 5,440,692 | 8/1995 | Janicek | 395/700 |
| 5,446,854 | 8/1995 | Khalidi et al. | 395/401 |
| 5,446,863 | 8/1995 | Stevens et al. | 395/427 |
| 5,561,786 | 10/1996 | Morse | 395/497.01 |
| 5,644,749 | 7/1997 | Obayashi | 395/421.1 |

OTHER PUBLICATIONS

"Accelerated Graphics Port Interface Specification", Rev. 1.0, Intel Corporation, Jul. 31, 1996.
"An Algorithm For Dynamic Memory Management", Sturges, et al., 9 pp., 1991.
"PCI Local Bus Specification", Revision 2.1, pp. i–xvi & 1–281, Jun. 1, 1995.

*Primary Examiner*—John W. Cabeca
*Assistant Examiner*—David Ransom
*Attorney, Agent, or Firm*—Laura L. Mikkola

[57] ABSTRACT

A method and apparatus for dynamically allocating system memory using a binary tree organized in an address and size dependent manner. Within the prior art, dynamic memory allocation methods were not portable to virtual memory addressing systems wherein local memory and system memory were joined in a continuous region of linear addresses. The allocation method of the present invention utilizes a binary tree of free memory block headers, corresponding to free memory blocks. Each free memory block header has an address field and a translation table field. The address field corresponds to a virtual address of the free memory block. The translation table field points to an entry within a translation table that is used to map the virtual address to a block in system memory.

31 Claims, 14 Drawing Sheets

METHOD AND APPARATUS FOR DYNAMIC MEMORY MANAGEMENT BY ASSOCIATION OF FREE MEMORY BLOCKS USING A BINARY TREE ORGANIZED IN AN ADDRESS AND SIZE DEPENDENT MANNER

This application is a continuation-in-part of U.S. application Ser. No. 08/273,367, filed Jul. 11, 1994, now U.S. Pat. No. 5,742,793, which is a continuation of U.S. application No. 07/809,784, filed Dec. 18, 1991, now abandoned.

FIELD OF THE INVENTION

The present invention relates to the field of computer system memory allocation. More specifically, the present invention is related to dynamic memory management by association of free memory blocks organized in an address and size dependent manner.

BACKGROUND OF THE INVENTION

Dynamic management of memory, that is dynamic allocation and deallocation of memory to executing programs, regardless of whether it is implemented in a memory controller, an operating system, or a runtime library of a programming language, allows more efficient utilization of the available memory pool. Traditionally, a memory pool is dynamically managed using one of five well known classical methods; namely, First Fit, Best Fit, Buddy, Left Most and Better Fit. Each of the classical dynamic memory management methods has its advantages and disadvantages. Preferences typically depend on trade-offs between performance versus memory utilization.

Under the First Fit and Best Fit methods, performance is traded off for fuller memory utilization. The small typically useless memory fragments resulting from repeated allocations and deallocations are still tracked and chained in the free memory list at the expense of increased allocation time. In contrast, the Buddy method trades off memory utilization for performance. By rounding memory request up to an allowable size, the Buddy method eliminates these small useless memory fragments and therefore the time wasted on chaining them in the free memory list at the expense of wasted memory. Typically, the Buddy method requires a larger amount of space than a similarly-sized memory request using the First Fit or Best Fit methods.

Similarly, the Left Most Fit method trades memory utilization for performance. By allocating only from the left side of the free memory tree, the Left Most Fit method improves allocation time at the expense of an unbalanced free memory tree with small useless memory fragments accumulated on the right hand side of the free memory tree. Likewise, the Better Fit method trades performance for memory utilization. By allocating from both sides of the free memory tree and preserving the larger memory fragments, the Better Fit method reduces the small useless memory fragments at the expense of allocation time.

One disadvantage of the five classical methods is that they are not optimized to take advantage of virtual address systems using physical memory space including both host memory and local graphics memory. With the development of the Accelerated Graphics Port (AGP) interface specification, the ability to use this virtual memory space for graphics rendering has become possible.

The AGP interface may work with the peripheral component interconnect (PCI) bus specification in order to provide users with high-speed graphics computer platforms. More information about virtual memory AGP and PCI systems can be found in the current *AGP Interface Specification*, Rev. 1.0 (July 1996), available from Intel Corporation of Santa Clara, Calif. The PCI protocol is described in the current *PCI Local Bus Specification*, Rev. 2.1 (July 1995), available from the PCI Special Interest Group (SIG) in Hillsboro, Ore.

The AGP interface may operate in either a direct memory access (DMA) mode, wherein data is transferred from system memory to local memory before execution, or an execute mode wherein a combination of local memory and system memory are used as primary graphics memory. The execute mode is advantageous in that either local or system memory space may be used according to performance optimization routines. When the AGP interface is running in execute mode, it is imperative that a memory mapping mechanism be used to map random pages of memory into a contiguous physical address space.

One aspect of the PCI and AGP system is that it provides for an area of PCI memory reserved for the graphics linear frame buffer. This memory area is referred to as the "Linear Frame Buffer Aperture." This space is reserved upon boot-up specifically to hold the frame buffer.

It is desirable to implement a dynamic memory management method that is portable to a virtual memory system, wherein the physical memory includes both local graphics memory and system memory segments. As will be disclosed, the present invention provides a method and apparatus for dynamic memory management that achieves the desirable result.

SUMMARY OF THE INVENTION

A method and apparatus for dynamically allocating system memory using a binary tree organized in an address and size dependent manner is described. A binary tree of free memory block headers, corresponding to free memory blocks, is constructed. Each free memory block header has an address field and a translation table field. The address field corresponds to a virtual address of the free memory block. The translation table field points to an entry within a translation table. The entry within the translation table in turn points to a free block of system memory. Thus, the translation table is used to map the virtual address of the free memory block into system memory. Upon receiving an allocation request, the free memory block of system memory is allocated by using the binary tree of free memory block headers.

BRIEF DESCRIPTION OF THE DRAWINGS

The invention will be described by way of exemplary embodiments, but not limitations, illustrated in the accompanying drawings in which.

DETAILED DESCRIPTION OF THE INVENTION

A method and apparatus for portable dynamic memory management is disclosed, which has particular application to graphics and memory controllers, operating systems, and runtime libraries of programming languages. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
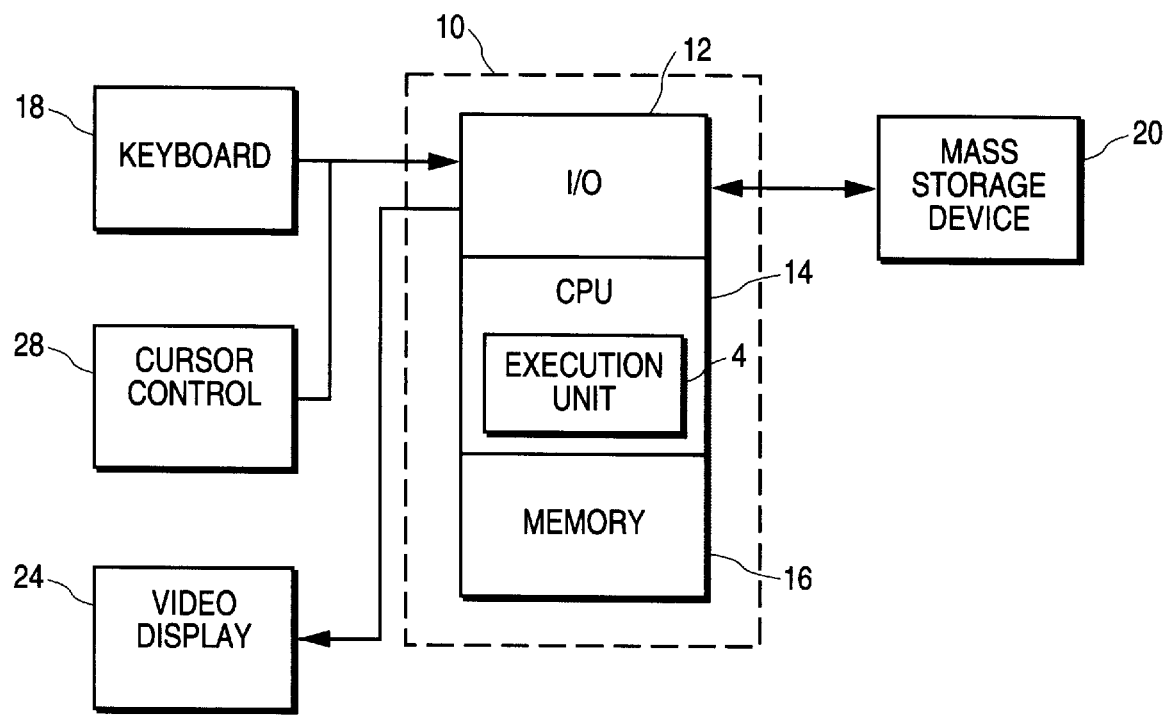
FIG. 1 shows a physical view of the hardware elements of a computer system embodying the portable dynamic memory management teachings of the present invention.

Referring now to FIG. 1, a block diagram illustrating a computer system embodying the portable dynamic memory management teachings of the present invention is shown. Shown is a computer 10 which comprises three major components 12, 14, and 16. The first of these is an input/output (I/O) circuit 12 which is used to communicate information in appropriately structured form to and from other portions of the computer 10. In addition, the computer 10 includes a central processing unit (CPU) 14 coupled to the I/O circuit 12, and a memory 16. The I/O circuit 12, the CPU 14 and the memory 16 are those typically found in most general purpose computers.

A mass storage device 20 is shown coupled to the I/O circuit 12 to provide additional storage capability for the computer 10. Mass storage device may comprise a magnetic disk, or another long-term storage device such as an optical disk. It will be appreciated that additional devices may be coupled to the computer 10 for storing data such as magnetic tape drives, as well as networks which are in turn coupled to other computer systems. As is well known, the disk 20 may store other computer programs, characters, and routines which may be accessed and executed by the CPU 14. The CPU 14 includes an execution unit 4 that executes programming instructions and routines stored on a storage medium, such as disk 20. Additionally, the computer programs, characters, and routines may be loaded into a storage medium comprising memory 16 prior to being executed by the CPU 14. Because the memory 16 typically comprises short-term memory, such as dynamic random access memory (DRAM), the memory 16 takes less time to access than the disk 20.

A raster display monitor 24 is shown coupled to the I/O circuit 12 and is used to display images generated by the CPU 14. Any well known variety of raster displays may be utilized as display 24. A keyboard 18 is shown coupled to the I/O circuit 12 and is used to input data and commands into the computer 10, as is well known. A cursor control device 28 is also shown coupled to the computer 10 through the I/O circuit 12. Any well known variety of cursor control devices may be utilized as cursor control device 28.

The several hardware elements illustrated are intended to represent a broad category of computer systems. One particular example is a computer system based on a Pentium ® Pro processor, manufactured by Intel Corporation of Santa Clara, Calif. Other computer systems may of course be adapted in a straight forward manner to perform the functions described below.

Figure 2:
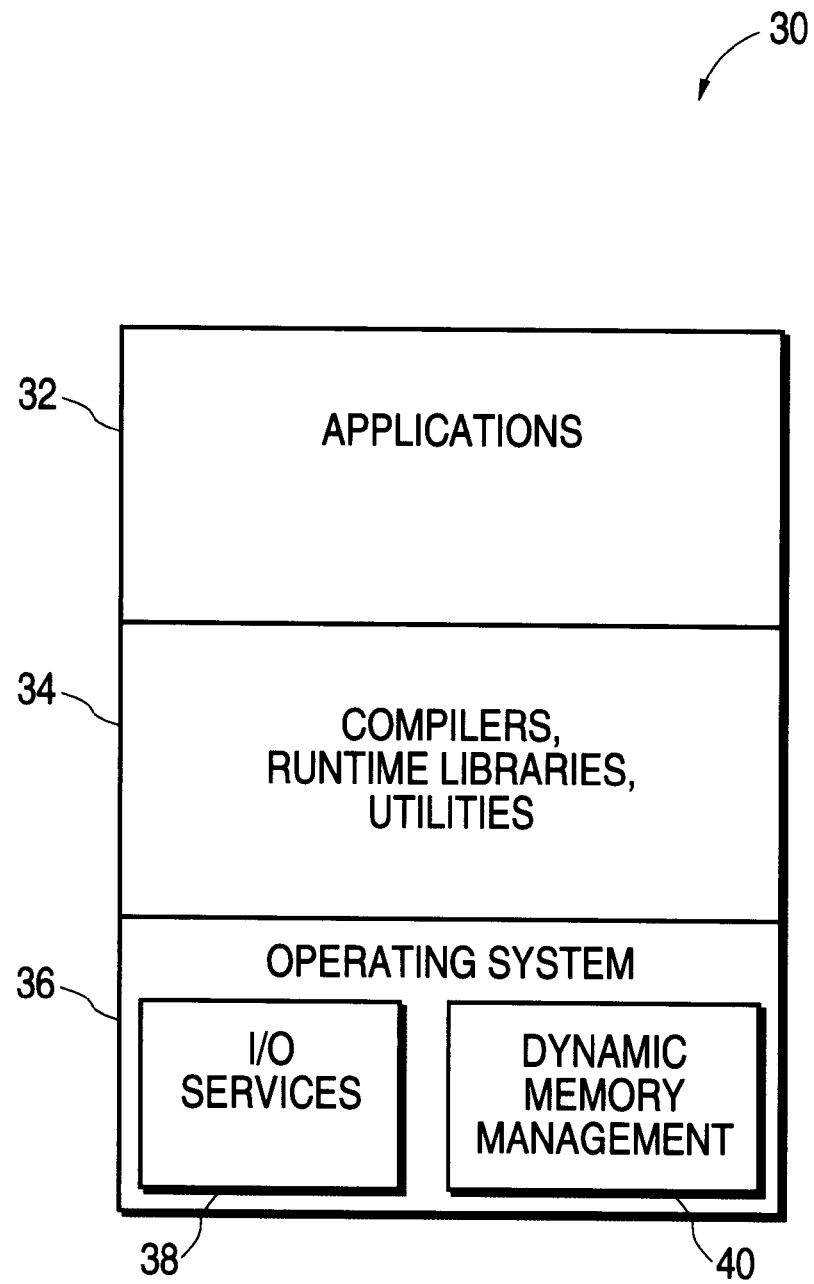
FIG. 2 shows a logical view of the software elements of the computer system illustrated in FIG. 1.

Referring now to FIG. 2, a block diagram illustrating a logical view of the software elements of the computer system illustrated in FIG. 1 is shown. An operating system 36 provides various system services to other programs executing on the computer system. In particular, the operating system 36 provides input/output (I/O) services 38 for accessing any I/O devices and dynamic memory management 40 for managing allocation and deallocation of the computer system's memory to executing programs in accordance to the teachings of the present invention. As will be described, it is immaterial whether operating system 36 provides virtual memory addressing similar to the memory addressing found in the well known UNIX™ system, or static memory addressing similar to the memory addressing found in the well known DOS.

Also shown are programming language compilers, software tools/utilities and their runtime libraries 34 for application development and execution. The applications 32 executing on the computer system utilize the underlying system services offered by runtime libraries 34 and the operating system 36. These software elements are those typically found in most general purpose computer systems and almost all special purpose computer systems.

Although the dynamic management of memory allocation and deallocation of the present invention is implemented as part of the operating system 36, the present invention may also be implemented as part of the memory controllers of various memory units, or as part of the runtime libraries of the various programming languages. The present invention may be implemented as part of any system or subsystem that manages memory allocation of a memory pool.

The different levels of software shown in FIG. 2 typically reside on a permanent form of data storage device. For instance, the BIOS, for performing the I/O services 38, is typically programmed into one or more programmable read-only-memory (PROM) devices that are used along with dynamic random access memory (DRAM) to implement system memory 16. The application programs 32, runtime libraries 34 and operating systems 36 typically reside on a hard drive. These permanent forms of data storage are slow to access. When it is necessary for the program to be executed, the program or a portion thereof is loaded into system memory 16 so as to decrease execution times.

Figure 3:
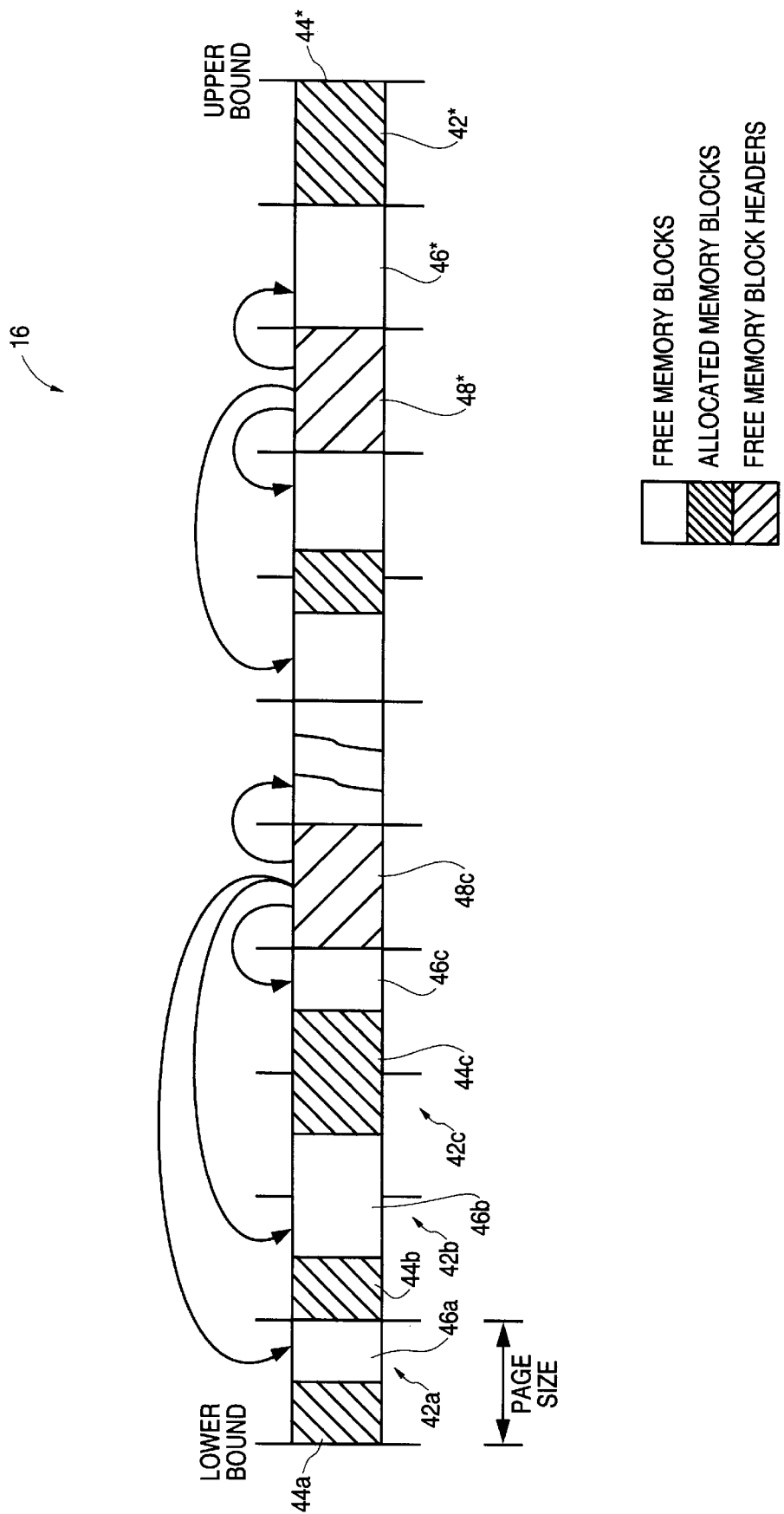
FIG. 3 shows a logical view of the memory architecture of the computer system illustrated in FIG. 1.

Referring now to FIG. 3, the memory architecture of the computer system illustrated in FIG. 1 is shown. Shown is the memory 16 logically divided into a plurality of fixed size memory pages/segments, 42a–42*. Each memory page/segment, 42a, . . . , or 42*, comprises a plurality of memory words. Also shown are allocated memory blocks 44a–44*, and free memory blocks 46a–46* (unallocated). Each allocated/free memory blocks 44a, . . . , 44*, 46a, . . . , or 46*, comprises a plurality of contiguous memory words that may or may not span multiple memory pages/segments 42a–42*.

Also shown is a plurality of memory blocks, 48a–48\* allocated for storing free memory block headers. The free memory block headers point to the free memory blocks 46a–46\*. There is one free memory block header for each free memory block 46a–46\*. Additionally, the free memory block headers are logically organized as a Cartesian binary tree to facilitate dynamic allocation and deallocation of free memory blocks 46a–46\*. Collectively, the free memory block headers form a free memory block header list. The organization of the free memory block headers and their usage will be described in further detail below.

Although the free memory block headers are shown to be stored in memory blocks 48a–48\* having sizes of a memory page/segment, it will be appreciated that the free memory block headers may be stored in memory blocks having sizes smaller or greater than a memory page/segment.

Figure 4:
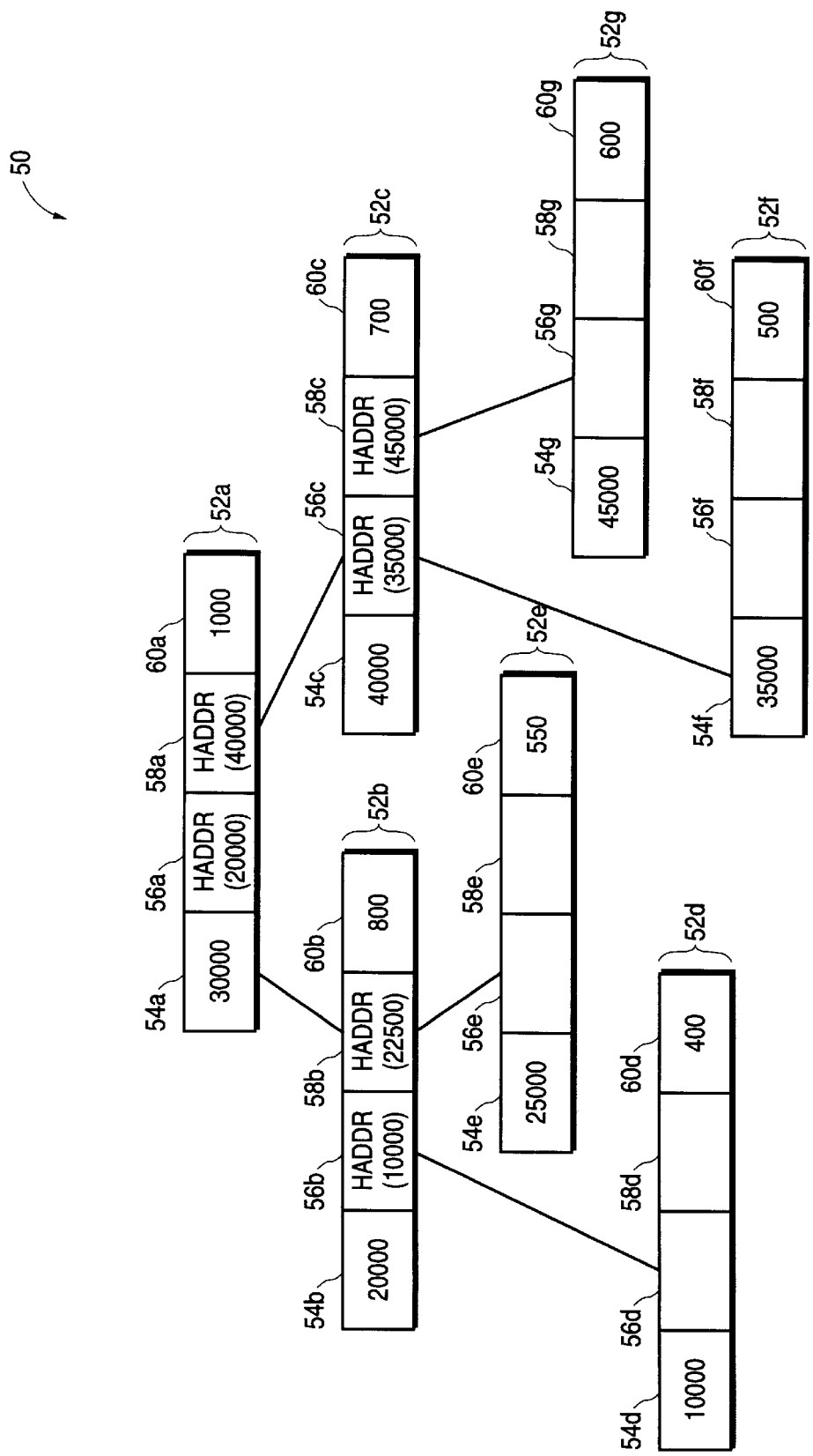
FIG. 4 shows a logical view of an exemplary free memory block header list illustrating the free memory block header list structure and the free memory block headers of the present invention.

Referring now to FIG. 4, a block diagram illustrating an exemplary free memory block header list comprising exemplary free memory block headers of the memory illustrated in FIG. 3 is shown. Shown is an exemplary free memory block header list 50 comprising a root free memory block header 52a, and a plurality of descendant free memory block header 52b–62f. Each of the exemplary free memory block header, 52a, . . . or 52g, corresponds to a free memory block currently not allocated to any executing program.

The exemplary free memory block header list 50 is organized as a Cartesian binary tree as follows:

1) both first generation descendant free memory blocks corresponding to the first generation descendant free memory block headers 52b and 52c of the root free memory block header 52a are smaller than the root free memory block; additionally, the first generation left descendant free memory block has a lower address and the first generation right descendant free memory has a higher address than the address of the root free memory block;

2) both second generation descendant free memory blocks corresponding to the second generation descendant free memory block headers 52d and 52e of the first generation left descendant free memory block header 52b are smaller than the first generation left descendant free memory block; additionally, the second generation left descendant free memory block has a lower address and the second generation right descendant free memory has a higher address than the address of the first generation left descendant free memory block; and 3) both second generation descendant free memory blocks corresponding to the second generation descendant free memory block headers 52f and 52g of the first generation right descendant free memory block header 52c are smaller than the first generation right descendant free memory block; additionally, the second generation left descendant free memory block has a lower address and the second generation right descendant free memory has a higher address than the address of the first generation right descendant free memory block.

In general, a free memory block header list is organized as a Cartesian binary tree having the following properties:

For any free memory block header E,
if F(E) denotes the descendants of E,
Left(F(E)) denotes the left descendants of E, and
Right(F(E)) denotes the right descendants of E,
then for all i in Left(F(E)) and all j in Right(F(E)),
address(i)<address(E)<address(j), and
length(i)<=length(E)=>length (j).

As illustrated by the exemplary free memory block header list 50, each free memory block header, 52a, . . . , or 52g, comprises a free memory block address, 54a, . . . , or 54g, and a free memory block size, 60a, . . . , or 60g. The free memory block address, 54a, . . . or, 54g, identifies the starting location of the corresponding free memory block, whereas, the free memory block size, 60a, . . . , or 60g, identifies the size of the corresponding free memory block.

Additionally, each free memory block header, 52a, . . . , or 52g, further comprises a left descendant free memory block header address, 56a, . . . , or 56g, and a right descendant free memory block header address, 58a, . . . , or 58g. If a free memory block header has a left descendant free memory block header, 52a, 52b, or 52c, the left descendant free memory block header address, 56a, 56b, or 56c identifies the starting location of the left descendant free memory block header, 52b, 52d, or 52f; otherwise, 52d, 52e, 52f, or 52g, the left descendant free memory block header address, 56d, 56e, 56f, or 56g contains a null pointer. Similarly, if a free memory block header has a right descendant free memory block header, 52a, 52b, or 52c, the right descendant free memory block header address, 58a, 58b, or 58c identifies the starting location of the right descendant free memory block header, 52c, 52e, or 52g; otherwise, 52d, 52e, 52f, or 52g, the right descendant free memory block header address, 58d, 58e, 58f, or 58g contains a null pointer.

Although all free memory block headers with no descendant, 52d, 52e, 52f and 52g, were shown in FIG. 4 as having neither left nor right descendant free memory block headers at the same time, it will be appreciated that a free memory block header may have a left descendant free memory block header and no right descendant free memory block header, or vice versa.

Figure 5:
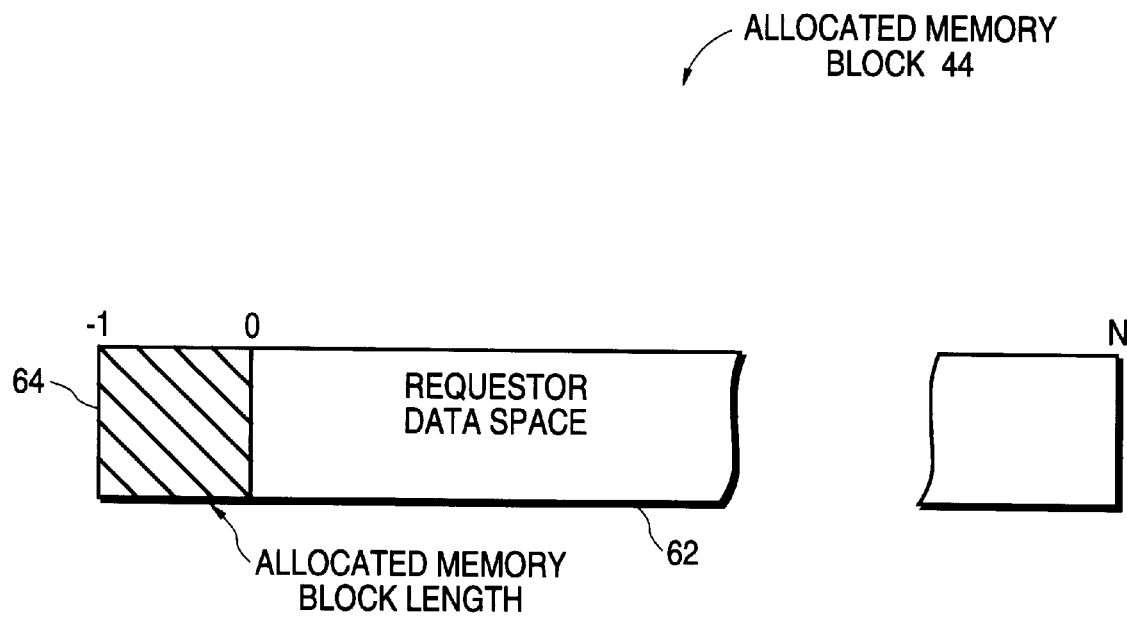
FIG. 5 shows a logical view of an allocated memory block of the present invention.

Referring now to FIG. 5, a block diagram illustrating an allocated memory block of the memory illustrated in FIG. 3 is shown. An allocated memory block 44 comprises at least one memory word 64 for storing the allocated memory block's block length and a plurality of memory words 62 allocated to the requester. Under the present invention, allocation of memory is rounded to the nearest multiples of system word size. The allocated memory block length is stored into the lower memory word(s) of the allocated memory block, aligned to the system's word boundary if necessary. Additionally, if the present invention is implemented in a programming language runtime library, acquisition of memory for the memory pool is further rounded to the nearest multiple of the system's page or segment size.

Figure 6:
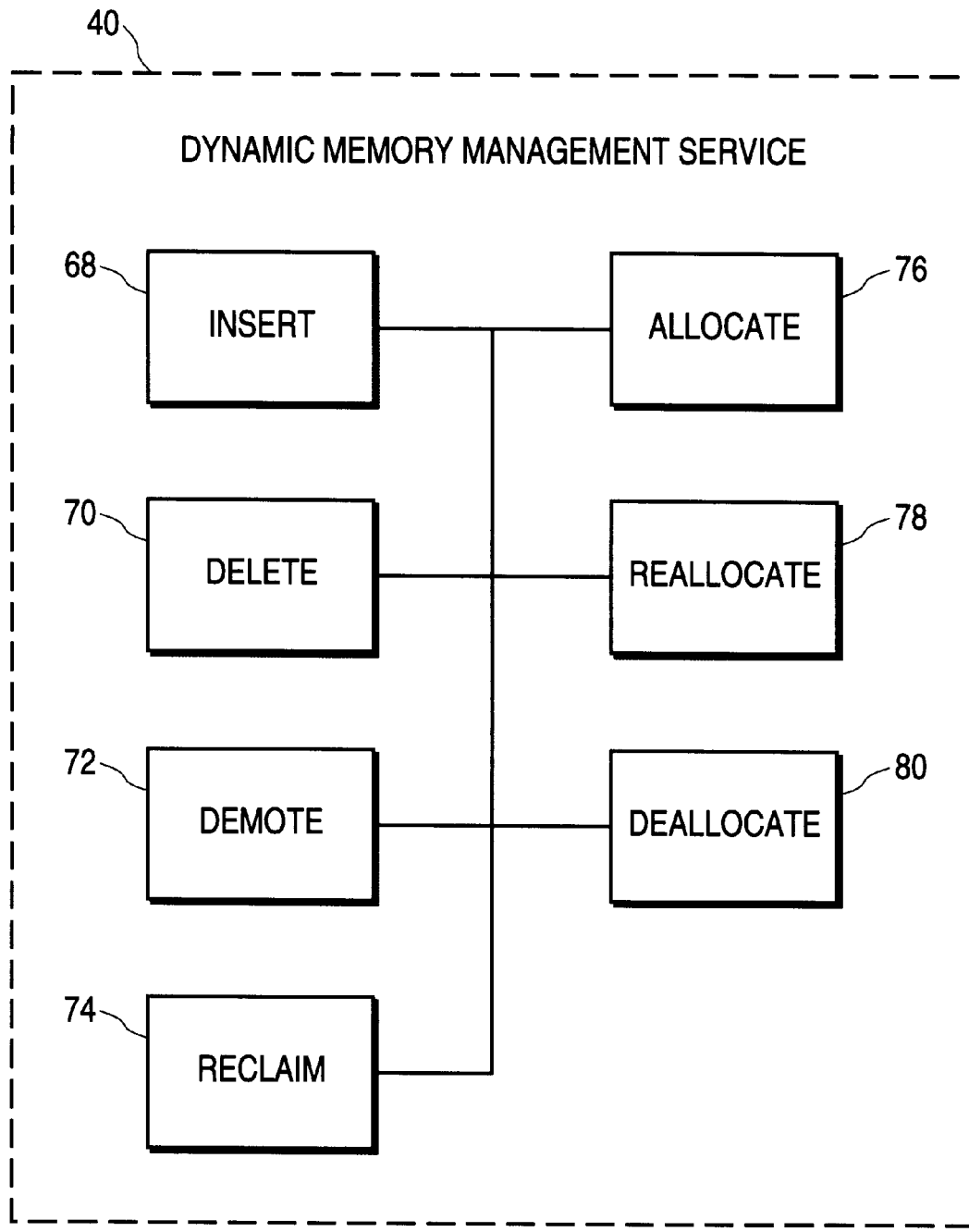
FIG. 6 shows a functional view of the dynamic memory management services of one implementation of the present invention at the operating system level.

Referring now to FIG. 6, a block diagram illustrating the dynamic memory management services of the operating system illustrated in FIG. 2 is shown. The dynamic memory management services 40 comprise a memory allocation procedure 76, a memory reallocation procedure 78, and a memory deallocation procedure 80. The allocate, reallocate and deallocate procedures 76–80 are used to allocate, reallocate and deallocate memory blocks. Additionally, the dynamic memory management services 40 further comprise an insert procedure 68, a delete procedure 70, a demote procedure 72 and a reclaim procedure 74. The insert, delete, demote and reclaim procedures 68–74 are used by the allocate, reallocate and deallocate procedures 76–80 to maintain the free memory block header list described earlier.

Still referring to FIG. 6, upon receipt of a memory allocation request, the allocate procedure 76 rounds the request size upward to the nearest multiple of the system word size. The allocate procedure 76 then searches the free memory block header list for a free memory block to allocate. Upon locating the free memory block, the allocate procedure 76 allocates the rounded amount of memory words to the requester. The allocate procedure 76 writes the allocated memory block size into the lower bound memory word(s) of the allocated memory block as illustrated earlier, and calls the delete or demote procedure 70 or 72 to update the free memory block header list, before returning the starting address of the allocated memory block to the requester. The allocate procedure 76 makes the necessary alignment when writing the allocated memory block size into the lower bound memory word(s).

The allocate procedure 76 searches the free memory block header list for a free memory block to allocate, starting with the root free memory block header traversing down through the descendant free memory block headers until the sizes of the corresponding free memory blocks of both descendant free memory block headers are too small or there are no more descendant free memory block headers. At each decision point, if both free memory blocks corresponding to the descendant free memory block headers can satisfy the request, the allocate procedure 76 traverse down the descendant free memory block header with the smaller free memory block.

The allocate procedure 76 calls the delete procedure 70 to delete the corresponding free memory block header from the free memory block header list if the entire located free memory block is allocated to the requester. The allocate procedure 76 calls the demote procedure 72 to reorder the free memory block header list if the located free memory block is being split and only a portion of the located free memory block is allocated to the requester.

By adjusting the rounding and alignment to the system word size, the allocate procedure 76 is made portable to different systems. In its presently preferred form, a rounding constant (WORDSIZE) and an alignment constant (ALIGNSIZE) is used to provide the allocate procedure 76 with the necessary information. Additionally, in its presently preferred form, the allocate procedure 76 is provided with the ability to initialize the allocated memory block at the request of the requester before returning to the requester.

If the allocate procedure 76 is implemented as part of the a runtime library of a programming language, it is also provided with the ability of acquiring additional memory from the operating system for its memory pool in multiples of the system's page or segment size. In that case, the allocate procedure 76 calls the insert procedure to update the free memory block header list. Similarly, an acquisition constant (SYSPAGE) is used to inform the allocate procedure 76 the system's page or segment size.

Pseudo code for the key code segments of one implementation of the allocate procedure 76 is shown in a substantially C-like language in Appendix A. The allocate procedure 76 as pseudo coded was implemented and incorporated into a C runtime library on a UNIX™ system running on an Intel i386™ microprocessor based computer system, and into a C runtime library on a DOS system running also on an Intel i386™ microprocessor based computer system (i386™ is a registered trademark of Intel Corporation). The acquisition constant (SYSPAGE) was set to 2000H on the UNIX™ system, and to FFFFH on the DOS system. The rounding constant (WORDSIZE) was set to 4 bytes on the UNIX™ system, and 2 bytes on the DOS system. The alignment constant (ALIGNSIZE) was set to 4 bytes on the UNIX™ system, and 0 bytes on the DOS system.

Still referring to FIG. 6, upon receipt of a reallocate request, the reallocate procedure 78 either decrease or increases the allocated memory block depending on the request. In the case of decreasing the allocated memory block, the reallocate procedure 78 reduces the memory allocation. The reallocate procedure 78 updates the allocated memory block length, preserves the data within the reduced allocated memory block, and calls the deallocate procedure 80 to deallocate the portion of the previously allocated memory block that is no longer required, before returning to the requester.

In the case of increasing the allocated memory block, the reallocate procedure 78 increases the memory allocation if possible. The reallocate procedure 78 calls the reclaim procedure 74 to determine if there is a free memory block adjacent to the allocated memory block, if so, coalesce them together. If the reclaim procedure 74 is successful in coalescing the allocated memory block with an adjacent free memory block, and the combined memory block is at least as large the new size requested, the reallocate procedure 78 allocates the combined memory block, preserves existing data in the previously allocated memory block, and calls the delete procedure 70 to update the free memory block header list. Additionally, if the combined memory block is larger than the new size requested, the reallocate procedure 78 reduces the combined memory block to the requested new size before allocating the combined memory block.

If the reclaim procedure 74 is unsuccessful in enlarging the allocated memory block to the requested new size, the reallocate procedure 78 then calls the allocate procedure 76 to allocate a new free memory block of the requested size, transfers the data in the previously allocated memory block to the newly allocated memory block, and calls the deallocate procedure 80 to deallocated the previously allocated memory block.

Pseudo code for the key code segments of one implementation of the reallocate procedure 78 is shown in a substantially C-like language in Appendix B. Similarly, the reallocate procedure 78 as pseudo coded was implemented and incorporated into the C runtime libraries described earlier. Only one minor emulation was necessary to incorporate the reallocate procedure 78 into the C runtime library on the DOS system described earlier. The sbrk( ) kernel memory facility on the UNIX™ system was emulated by the DOS interrupt 48H.

Still referring to FIG. 6, upon receipt of a deallocate memory request, the deallocate procedure 80 deallocates the previously allocated memory block. The deallocate procedure 80 searches the free memory block header list to determine if the memory block being deallocated has adjacent free memory block or not. If so, the deallocate procedure 80 coalesce these adjacent free memory blocks with the memory block being deallocated, and calls the delete procedure 70 to delete the free memory block headers of the adjacent free memory blocks from the free memory block header list. The deallocate procedure 80 then calls the insert procedure 68 to insert the corresponding free memory block header for the memory block being deallocated, with or without coalesced adjacent free memory blocks, into the free memory block header list at the appropriate point.

Pseudo code for the key code segments of one implementation of the deallocate procedure 80 is shown in a substantially C-like language in Appendix C. Similarly, the deallocate procedure 80 as pseudo coded was implemented and incorporated into the C runtime libraries described earlier.

Still referring to FIG. 6, upon receiving an insertion request, the insert procedure 68 locates the correct position with respect to the existing free memory block headers within the free memory block header list, and inserts a free memory block header. The insert procedure 68, starting from the root free memory block header, performs a binary search for the first free memory block with a free memory block size less than the free memory block size of the free memory block whose header is to be inserted into the header list. The insert procedure 68 traverses down the left descendant if the address of the free memory block whose header is to be inserted is smaller than the address of the corresponding free memory block of the current free memory block header, otherwise, the insert procedure 68 traverses down the right descendant.

Upon locating the proper insertion point, the insert procedure 68 updates the descendant pointer of the predecessor free memory block header to point to the free memory block header being inserted, and the descendant pointer of the free memory block header being inserted to point to the previous descendant accordingly. In the event that the free memory block whose header is to be inserted into the header list is the smallest free memory block, the null descendant pointer of the predecessor free memory block header is updated to point to the free memory block header being inserted, and the descendant pointer of the free memory block header is set to null.

Pseudo code for the key code segments of one implementation of the insert procedure 68 is shown in a substantially C-like language in Appendix D. Similarly, the insert procedure 68 as pseudo coded was implemented and incorporated into the C runtime libraries described earlier.

Figure 7A:
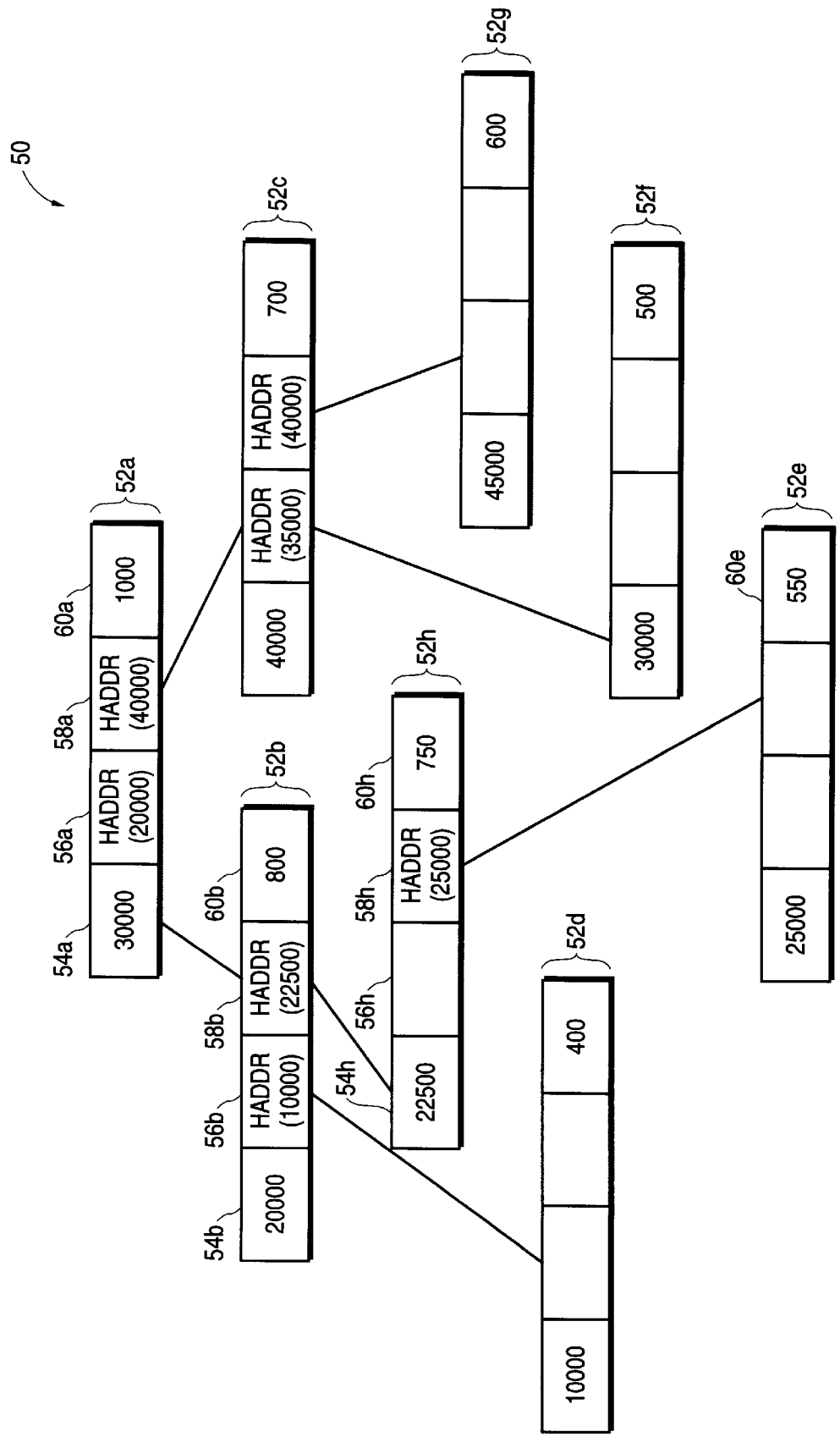
FIGS. 7a–7c show an exemplary insertion, an exemplary deletion and an exemplary demotion of a free memory block header illustrating maintenance of the free memory block header list of the present invention.

FIG. 7a illustrates an exemplary insertion of an exemplary free memory block header into the exemplary free memory block header list illustrated in FIG. 4. Shown is the exemplary free memory block header list 50 illustrated in FIG. 4 having the exemplary free memory block header 52h inserted into it.

Initially, the insert procedure compares the length of the free memory block 60h corresponding to the free memory block header 52h with the length of the free memory block 60a corresponding to the root free memory block header 52a. Since the length of the free memory block 60h corresponding to the free memory block header 52h is smaller, the insert procedure traverses to one of the first generation free memory block headers 52b or 52c. The insert procedure traverses to the left descendant, since the address of the free memory block 54h corresponding to the free memory block header 52h is smaller than the address of the free memory block 54a corresponding to the root free memory block header 52a.

Then, the insert procedure compares the length of the free memory block 60h corresponding to the free memory block header 52h with the length of the free memory block 60b corresponding to the first generation free memory block header 52b. Since the length of the free memory block 60h corresponding to the free memory block header 52h is smaller, the insert procedure traverses to one of the second generation free memory block headers 52d or 52e. The insert procedure traverses to the right descendant, since the address of the free memory block 54h corresponding to the free memory block header 52h is greater than the address of the free memory block 54b corresponding to the first generation free memory block header 52b.

Again, the insert procedure compares the length of the free memory block 60h corresponding to the free memory block header 52h with the length of the free memory block 60e corresponding to the second generation free memory block header 52e. Since the length of the free memory block 60h corresponding to the free memory block header 52h is greater, the correct insertion point is found. As illustrated, the right descendant pointer 58b of the first generation free memory block header 52b is updated to point to the address of the free memory block header 52h. Additionally, the right descendant pointer 58h of the free memory block header 52h is updated to point to the free memory block header 52e.

Referring back to FIG. 6, upon receipt of a delete request, the delete procedure 70 merges the left and right descendant free memory block headers of the deleted free memory block header as either the left or right descendant free memory block headers of the deleted free memory block header's predecessor free memory block header, depending on whether the deleted free memory block header is a left or a right descendant of its predecessor free memory block header. If the deleted free memory block header is the root free memory block header, the delete procedure 70 merges the left and right descendant free memory block headers of the deleted root free memory block headers to form a new free memory block header list. In either case, the descendant pointers are updated accordingly.

Pseudo code for the key code segments of one implementation of the delete procedure 70 is shown in a substantially C-like language in Appendix E. Similarly, the delete procedure 70 as pseudo coded was implemented and incorporated into the C runtime libraries described earlier.

Figure 7B:
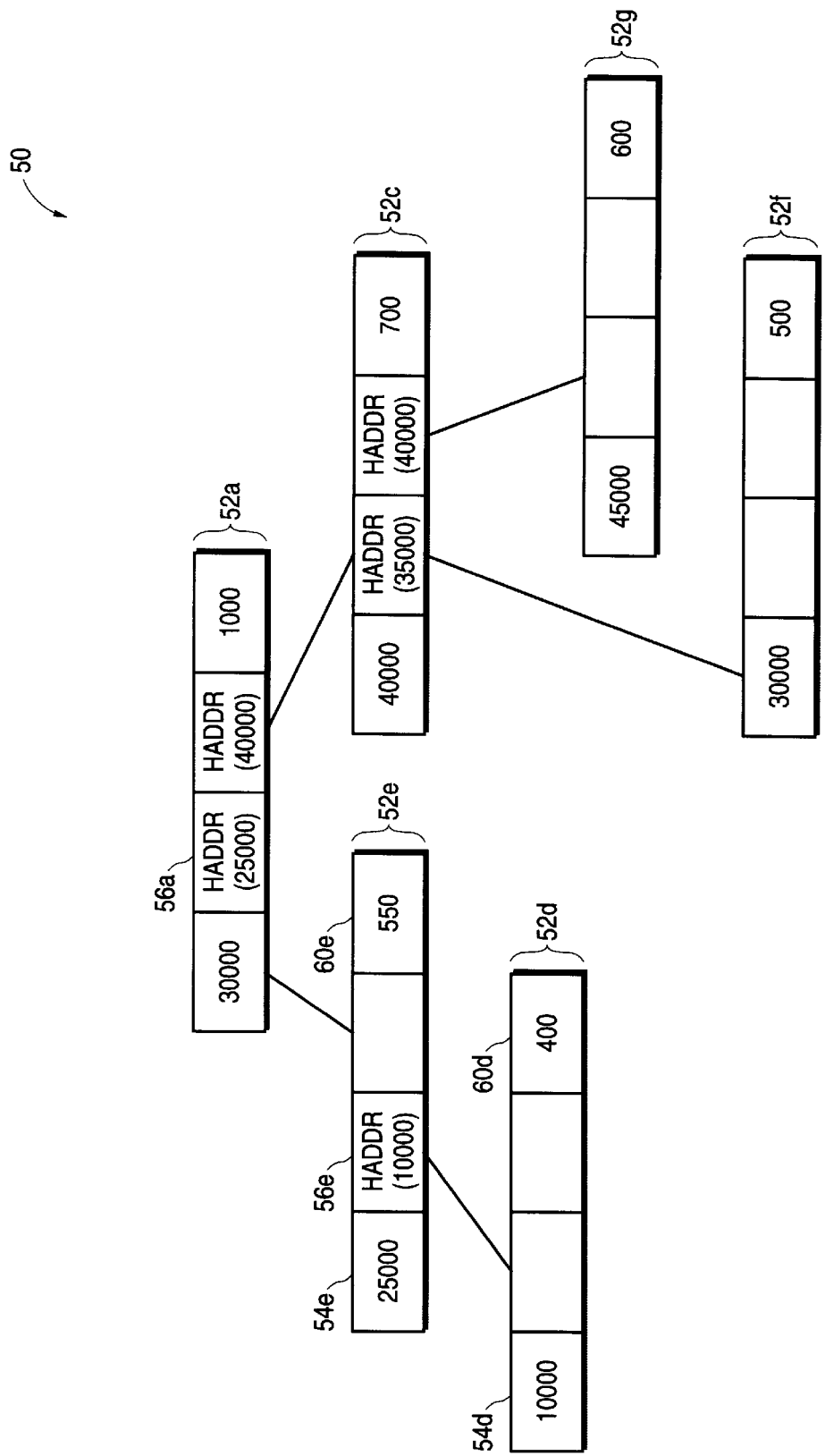

FIG. 7b illustrates an exemplary deletion of one of the exemplary free memory block header from the exemplary free memory block header list illustrated in FIG. 4. Shown is the exemplary free memory block header list 50 having the free memory block header list corresponding to the free memory block with the starting address "20000" deleted.

Since the deleted free memory block header was a left descendant of the free memory block header 52a, the delete procedure merges the remaining left and right descendant free memory block headers 52d and 52e as the left descendant free memory block headers of the root free memory block header 52a, which was the predecessor free memory block header of the deleted free memory block header. The remaining free memory block header 52d becomes the left descendant free memory block header of the other remaining free memory block header 52e, since the size of the free memory block 60d corresponding to the remaining free memory block header 52d is smaller than the size of the free memory block 60e corresponding to the other remaining free memory block header 52e, and the address of the free memory block 54d corresponding to the remaining free memory block header 52d is also smaller than the address of the free memory block 54e corresponding to the other remaining free memory block header 52e.

As illustrated, the left descendant pointer 56a is updated to point to the free memory block header 52e. Additionally, the left descendant pointer 56e of free memory block header 52e is in turn updated to point to the free memory block header 52d.

Referring back to FIG. 6, upon receipt of a demote request, the demote procedure 72 reorders the free memory block header list. The free memory block headers for the pre-split free memory block and all its descendant free memory blocks are deleted from the free memory block list. A new free memory block header is created for the residual free memory block. The newly created free memory block header for the residual free memory block and the deleted free memory block headers for the descendant free memory blocks of the pre-split free memory block are reinserted into the free memory block list in the appropriate locations.

Pseudo code for the key code segments of one implementation of the demote procedure 72 is shown in a substantially C-like language in Appendix F. Similarly, the demote procedure 72 as pseudo coded was implemented and incorporated into the C runtime libraries described earlier.

Figure 7C:
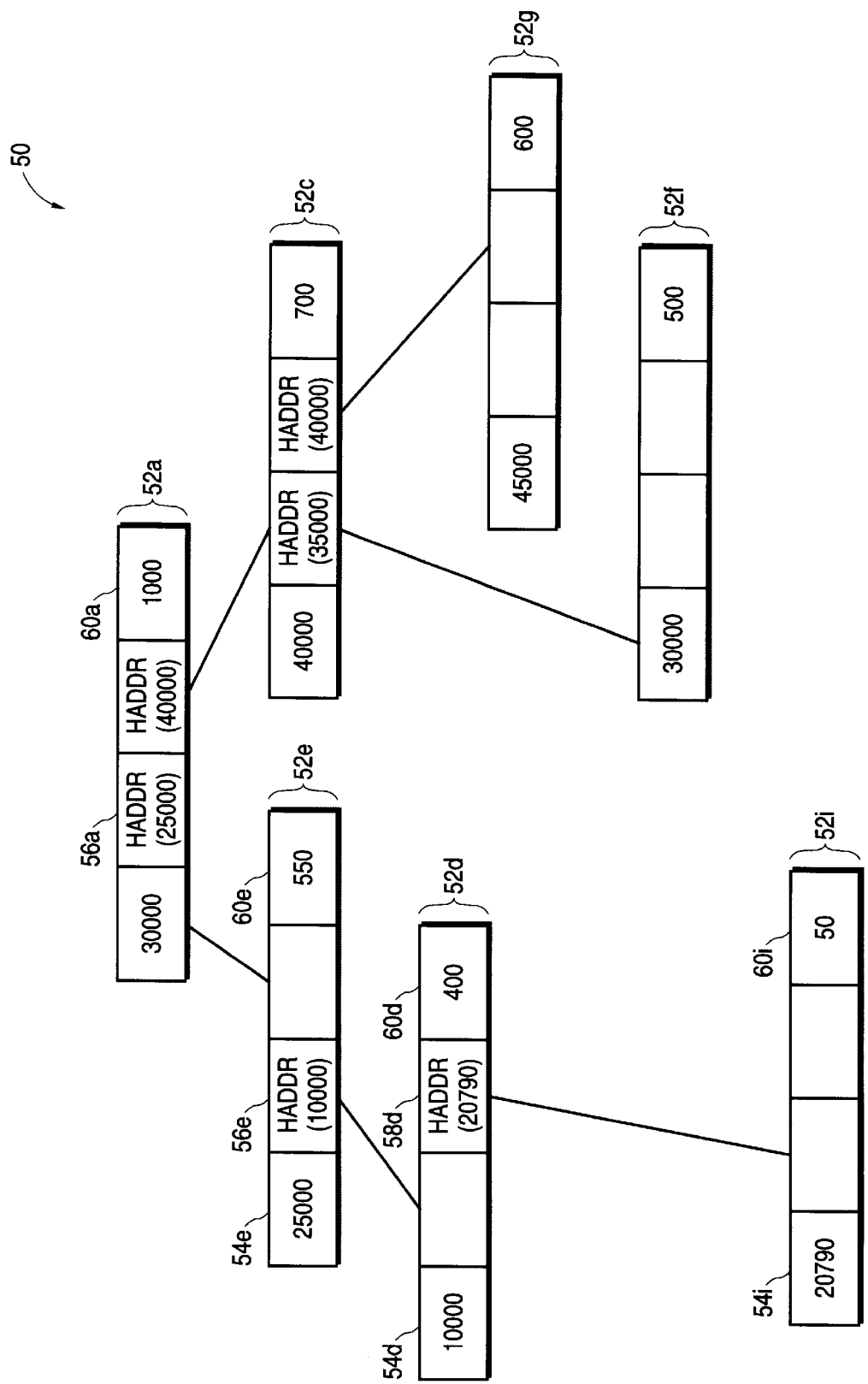

FIG. 7c illustrates an exemplary demotion of the exemplary free memory block header list illustrated in FIG. 4. Shown is the reordered exemplary free memory block header list 50 with the exemplary newly created free memory block header 52i for the residual free memory block from the pre-split free memory block with the starting address of "20000", and the former descendant free memory block headers of the pre-split free memory block header 52d and 52e, reinserted into the free memory block header list 50 in the appropriate locations. The exemplary residual free memory block is resulted from allocating 750 words out of the 800 words available in the free memory block with the starting address of "20000".

The free memory block header 52e becomes the left descendant free memory block header of the root free memory block header 52a, since the size of the corresponding free memory block 60e of free memory block header 52e is smaller than the size of the corresponding free memory block 60a of the root free memory block header 52a, and the address of the corresponding free memory block 54e of the free memory block header 52e is smaller than the address of the corresponding free memory block 54a of the root free memory block header 52a. Similarly, the free memory block header 52d becomes the left descendant free memory block header of the first generation free memory block header 52e, since the size of the corresponding free memory block 60d of free memory block header 52d is smaller than the size of the corresponding free memory block 60e of the first generation free memory block header 52e, and the address of the corresponding free memory block 54d of the free memory block header 52d is smaller than the address of the corresponding free memory block 54e of the first generation free memory block header 52e. Likewise, the new free memory block header 52i becomes the right descendant free memory block header of the first generation free memory block header 52e, since the size of the corresponding free memory block 60i of free memory block header 52i is smaller than the size of the corresponding free memory block 60d of the second generation free memory block header 52d, and the address of the corresponding free memory block 54i of the free memory block header 52i is larger than the address of the corresponding free memory block 54d of the second generation free memory block header 52d.

As illustrated, the left descendant pointer 56a is updated to point to the free memory block header 52e, the left descendant pointer 56e of free memory block header 52e is updated to point to the free memory block header 52d, and the right descendant pointer 58d of free memory block header 52d is updated to point to the free memory block header 52i.

Referring back to FIG. 6, upon receipt of a reclaim request, the reclaim procedure 74 determines if there is a free memory block adjacent to the previously allocated memory block, and if so, coalesce them together. The reclaim procedure 74, searches for the adjacent free memory block, starting with the root free memory block header. At each decision point, the reclaim procedure 74 traverses down to the next generation left descendant if the address of the adjacent free memory block is smaller than the address of the free memory block corresponding to the current free memory block header, otherwise, down to the next generation right descendant. If the reclaim procedure 74 is successful in locating a free memory block adjacent to the previously allocated memory block, the reclaim procedure 74 calls the delete procedure 70 to delete the corresponding free memory block header for the adjacent free memory block. Additionally, if the combined free memory block is larger than the requested new size, the reclaim procedure 74 calls the deallocate procedure to deallocate the excess portion of the combined free memory block.

Pseudo code for the key code segments of one implementation of the reclaim procedure 74 is shown in a substantially C-like language in Appendix G. Similarly, the demote procedure 74 as pseudo coded was implemented and incorporated into the C runtime libraries described earlier.

For another embodiment of the invention, the memory management procedures described herein above can be extended to a peripheral component interconnect (PCI) computer system including an accelerated graphics port (AGP) interface. In such a system, both local graphics memory and system memory may be used to extend the available memory within PCI address space.

One feature of the AGP interface is that 3-dimensional surface textures and other graphics operands can be placed in both traditional frame buffer memory and system memory. One way of taking advantage of this feature is to allocate a region of system memory at system initialization dedicated for the graphics operands. This particular implementation is disadvantageous, however, because once the region of system memory is allocated, it cannot be utilized by the operating system. This is a waste of limited system resources. The memory management method of the present invention reduces this waste of system resources by allocating system memory at the actual time of use and releasing the system memory when no longer needed.

Figure 8:
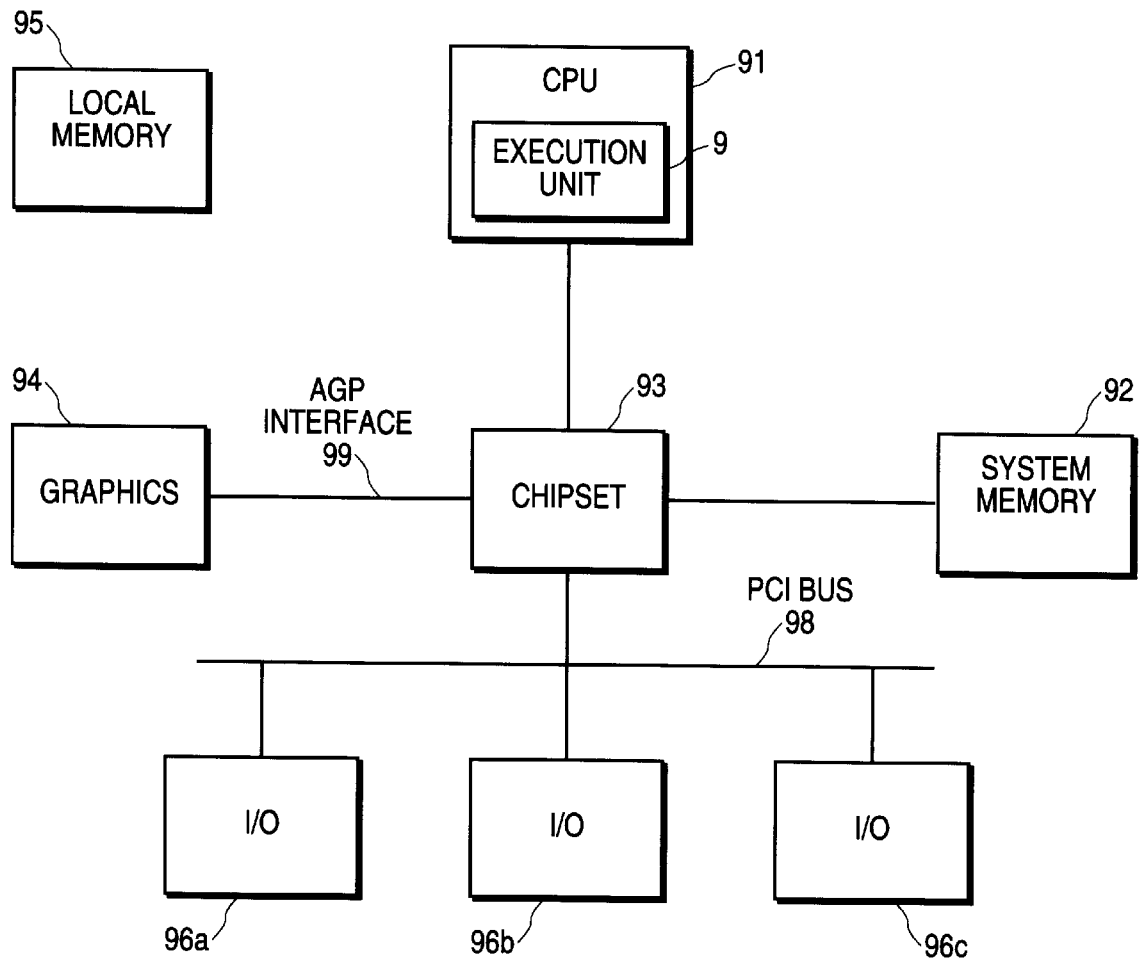
FIG. 8 illustrates a physical block diagram of a computer system including a graphics accelerator.

The functional block diagram of FIG. 8 illustrates a computer system including both the AGP and PCI interfaces. The system includes a CPU 91 coupled to a chipset 93. The CPU 91 includes an execution unit 9 that executes programming instructions received by the CPU 91. As was mentioned previously with reference to FIG. 1, the programming instructions may be stored in a storage medium comprising a disk (not shown) or system memory 92. Additionally, as is well-known in the prior art, programming instructions may be stored in a storage medium comprising an instruction cache (not shown) either internal or external to the CPU 91.

The chipset 93 comprises a number of functional units, each responsible for communicating with the various devices coupled to chipset 93. For instance, a memory controller unit facilitates communication with the system memory 92. A graphics interface unit communicates with the graphics accelerator chip 94. Moreover, the chipset 93 includes a bridge unit that is responsible for communicating with the input/output (I/O) devices 96a–c residing on the PCI bus 98.

For one embodiment, communication with the graphics accelerator chip 94 takes place over bus 99, operating according to the AGP interface specification. The graphics accelerator 94 is further coupled to a local memory device 95. As was described herein above, typically the local memory device 95 is used for storing the linear frame buffer. For one embodiment, local memory 95 comprises static random access memory (SRAM). Local memory 95 may alternatively be implemented in another well-known type of storage medium.

The embodiment of the invention described herein below provides for joining of local graphics memory 95 and system memory 92 into a virtual linear region.

Referring once again to FIG. 2, a logical diagram of software architecture is illustrated. As was mentioned previously, the dynamic memory management of the present invention may be implemented within the operating system 36. As an example, Microsoft Windows95™ VxD routines may be used to perform the allocation and deallocation of memory in accordance with one embodiment of the invention. The present invention may alternatively be implemented as a runtime library 34. For instance, the memory management routines may be implemented as a privilege level ("ring") 3 dynamically linked library (DLL).

Figure 9:
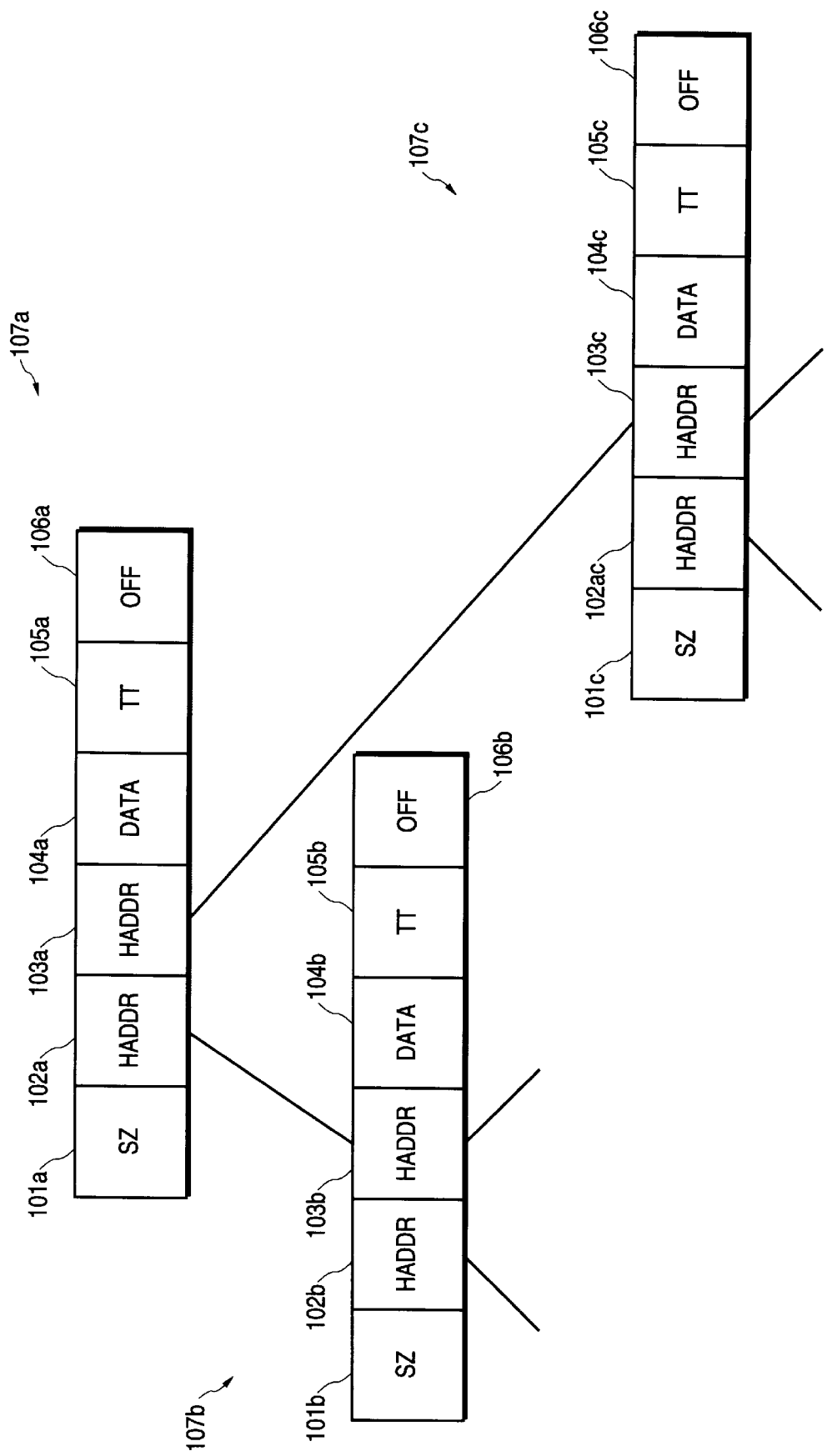
FIG. 9 illustrates a logical view of a memory header list in accordance with one embodiment of the invention.

FIG. 9 illustrates a logical diagram of another embodiment of a memory header list in accordance with an embodiment of the invention. Shown is an exemplary free memory block header list comprising a root free memory block header 107a, and descendant free memory block headers 107b and 107c. Similarly to the header list illustrated in FIG. 4 above, each of the free memory block headers 107a–107c corresponds to a free memory block currently not allocated to any executing program.

The free memory block header list of FIG. 9 is organized as a Cartesian binary tree, following the same criteria as described with reference to the embodiment of FIG. 4. Therefore, the free memory block header list of FIG. 9 is organized as a Cartesian binary tree having the following properties:

For any free memory block header E,
  if F(E) denotes the descendants of E,
    Left(F(E)) denotes the left descendants of E, and
    Right(F(E)) denotes the right descendants of E,
  then for all i in Left(F(E)) and all j in Right(F(E)),
    address(i)<address(E)<address(j), and block size(i) <=block size(E)=>block size(j).

Each free memory block header, 107a–107c comprises a free memory block size 101a–c, identifying the size of the corresponding free memory block. For one embodiment, each header corresponds to one 4K page of memory and therefore the block size 101a–c indicates this.

Similarly to the block header list of FIG. 4, each free memory block header 107a–c further comprises a left descendant free memory block header address 102a–c and a right descendant free memory block header address 103a–c. If free memory block header 107a has a left descendant free memory block header, such as left free memory block header 107b, the left descendant free memory block header address, 102a identifies the starting location of the left descendant free memory block header 107b. Otherwise, if there is no left descendant free memory block header, the header address 102a contains a null pointer.

Similarly, if free memory block header 107a has a right descendant free memory block header 107c, the right descendant free memory block header address 103a identifies the starting location of the right descendant free memory block header 107c. Otherwise, if there is no right descendant free memory block header, the header address 103a contains a null pointer.

As was mentioned above, for one embodiment of the invention, local memory and system memory are virtually mapped to form a contiguous address space. The free memory block headers 107a–c include three fields used to accomplish this virtual mapping.

The data fields 104a–c in each of the free memory block headers 107a–c indicate the virtual address of the free memory block. The translation table field 105a–c indicates an entry within a translation table. The translation table, as described in more detail herein below, includes a number of entries, each of which points to a free block of system memory. The translation table therefore provides for a level of indirection between the virtual address 104a–c and the corresponding system memory block.

The offset field 106a–c of each of two free memory block headers 107a–c indicates an offset within the system memory block at which data can be stored. The offset parameter 106a–c will only contain a value greater than 0 if the corresponding free memory block is only partially free. This situation will occur when a memory object crosses over multiple blocks of system memory, thereby spilling over into the free memory block. Otherwise, if the entire system memory block is free, the offset parameter will be equal to 0. The next memory object to be stored into the system memory block will therefore be aligned at the boundary of the free system memory block.

Figure 10:
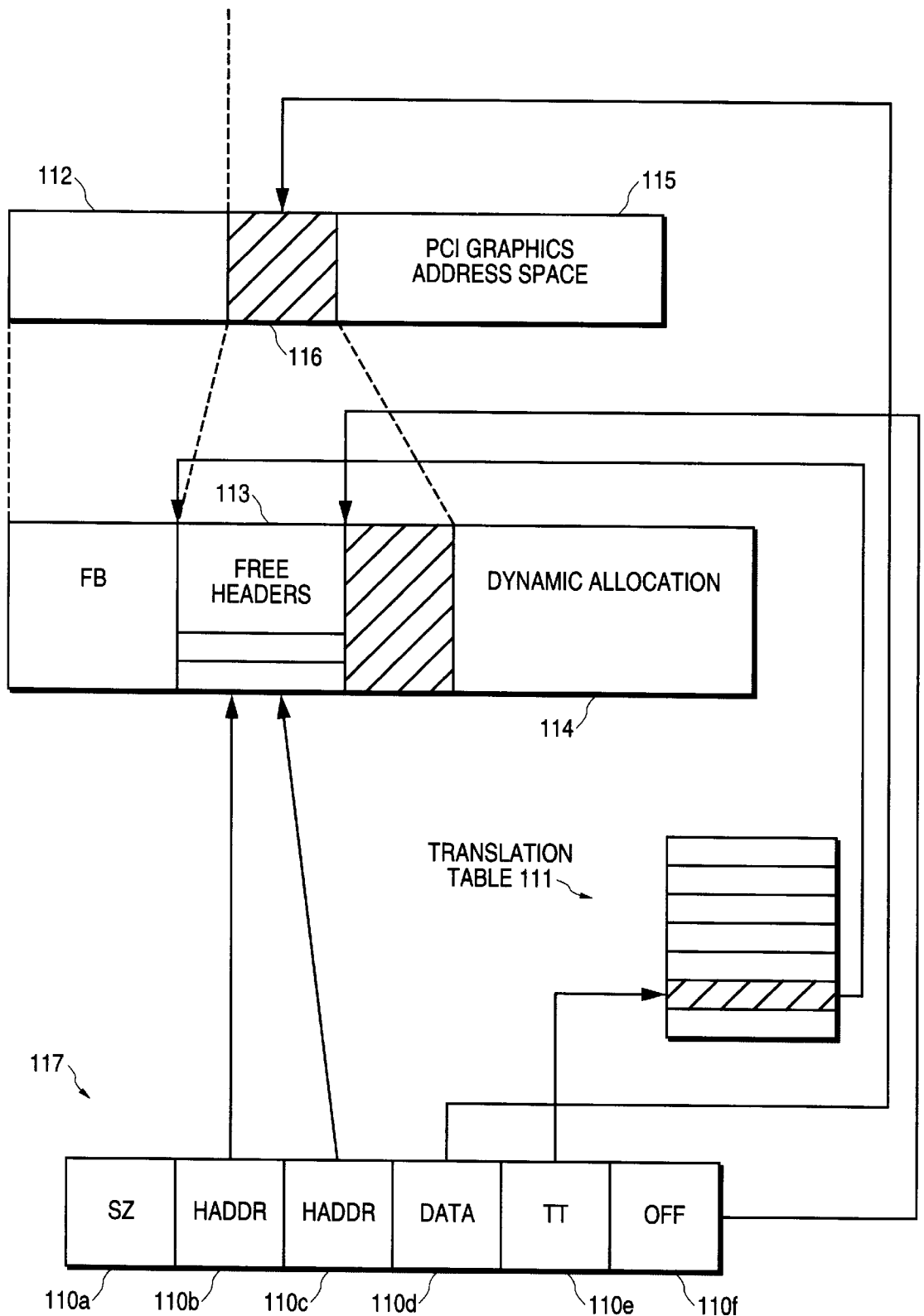
FIG. 10 illustrates a logical block diagram of memory addressing in accordance with one embodiment of the invention.

FIG. 10 illustrates a logical diagram of one embodiment of memory management including a translation table. PCI address space 115 is a continuous region of virtual addresses available to various "clients." One example of a client that accesses PCI address space 115 is the graphics accelerator. Other examples include applications running on the CPU 91, or devices residing on the PCI bus 98.

The first block of address space 112 of FIG. 10 is the linear frame buffer aperture; this block is reserved for storing the linear frame buffer. The addresses above that frame buffer, starting with free space 116, are available for virtual memory mapping in accordance with the present invention. For one embodiment, the linear frame buffer is instead stored in another memory device, such as system memory device 92. For this embodiment, the entire address space 115 is available for virtual memory mapping in accordance with the present invention.

The virtual address used to access free space 116 corresponds to a free memory block header within free memory header list 113. The free memory block header 117 includes fields 110a–110f, which are similar to those discussed with reference to FIG. 9. The data field 110d contains the virtual address of free space 116 within PCI address space 115. The size 110a indicates the size of the free memory block. The left free header address 110b and right free header address 110c point to the corresponding left and right free headers within the binary tree. The free headers used within the binary tree reside within the free header list 113.

The translation table field 110e points to an entry within the translation table 111. The translation table entry in turn points to a block within system memory. As was described herein above, the offset parameter 110f points to an offset within the system memory block at which new data may be stored.

System memory blocks are allocated to clients on demand, and therefore the amount of system memory occupied at any one time is dynamic. As such, dynamically allocated system memory 114 is shown as a broken line to indicate that its size increases and decreases depending on demand.

Figure 11:
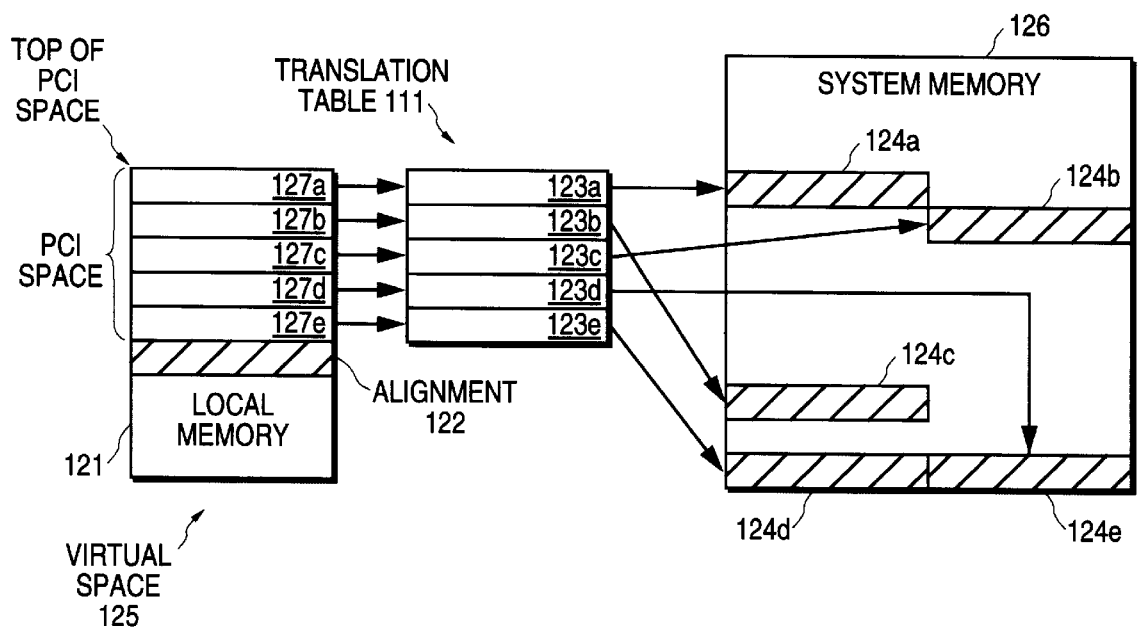
FIG. 11 illustrates a logical block diagram of memory mapping in accordance with one embodiment of the invention.

FIG. 11 illustrates a logical diagram of the memory mapping according to one embodiment of the invention. The continuous region of virtual PCI address space 125 contains the local memory aperture 121, reserved for the graphics linear frame buffer. Depending on the size of the linear frame buffer, an amount of alignment space 122 may exist such that the entries 127a–e within the PCI space may be aligned with the top of the PCI space.

For an alternate embodiment of the invention, there is no address space reserved for the graphics linear frame buffer. The entire virtual address space is therefore available for memory mapping in accordance with the present invention.

While the PCI space and translation table are illustrated in FIG. 11 to include five entries 127a–e and 123a–e, it should be appreciated that the size and number of entries may be varied without departing from the scope of the invention.

Entries 127a–e each represent a virtual address available on demand to PCI clients. Each entry 127a–e corresponds to an entry within the translation table 111. For instance, entry 127a points to entry 123a within the translation table 111. The translation table entry 123a in turn points to a block 124a within system memory 126.

Thus, the addressing scheme involved in retrieving a block of data can be summarized as follows: (1) a PCI client asserts a virtual address within PCI space corresponding to, e.g., entry 127b; (2) the corresponding entry 127b is used to access an entry 123b within the translation table; and (3) the translation table entry 123b is then used to access a block 124c within system memory 126. The desired data resides within the block 124c.

For one embodiment, each translation table entry 123a–e is 32 bits long, and each translation table entry points to a 4-kilobyte block of system memory 124a–e. For one embodiment, the minimum size of the translation table 111 is 4×4 kilobytes. Moreover, in one embodiment each entry 127a–e within the PCI space is allocated in increments of 4 kilobytes. It should be appreciated, however, that any one of these memory sizes can be altered without departing from the scope of the present invention.

As was described above, many different clients may access addresses within the PCI space concurrently. In order to free memory resources, each entry within PCI space is allocated to each client upon demand. Thus, only a part of the translation table 111 need be resident at any one time. The translation table 111 may therefore be stored in system memory 126, with only portions being loaded into local graphics memory when needed.

Figure 12:
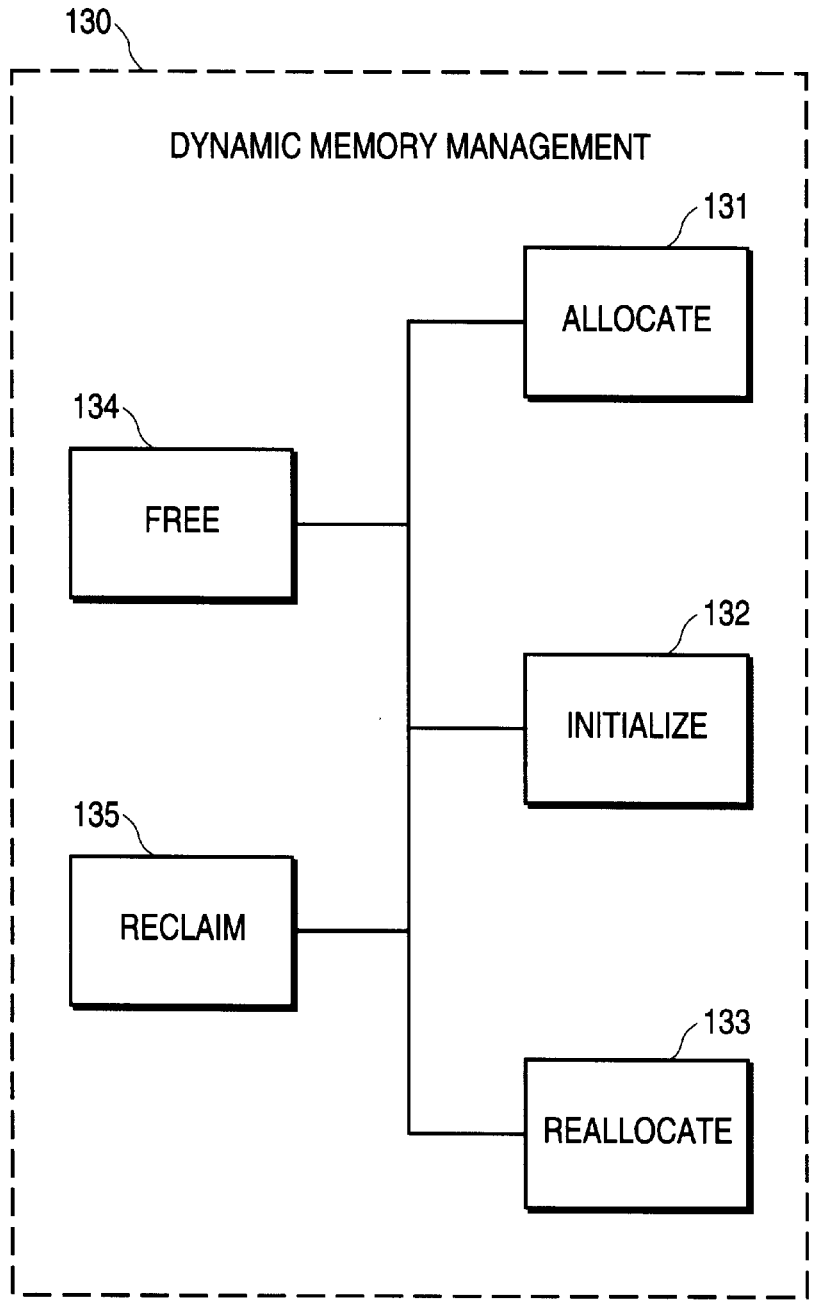
FIG. 12 shows a functional view of the dynamic memory management services of one embodiment of the present invention at the operating system level.

Referring now to FIG. 12, a block diagram illustrating the dynamic memory management program 130 of one embodiment of the invention is shown. The dynamic memory management services are similar to those described above with reference to FIG. 6. The dynamic memory management program 130 includes an allocate procedure 131, an initialize procedure 132, a reallocate procedure 133, a free procedure 134, and a reclaim procedure 135.

The allocate procedure 131 allocates a data block of a specified number of bytes. For one embodiment, the allocate procedure 131 uses as inputs the number of pages requested for a block (NumPages), the index of the next available block in the free header tree (BlockNumber), the type of memory usage (Type), and a flag (Flag) to specify the type of pages to be allocated. The Type field can be one of the following opcodes:

0x00000000 General

0x00000001 Frame Buffer

0x00000002 Surface

0x00000004 Texture

0x00000010 Z Buffer

0x00000020 Alpha Buffer

Upon receipt of a memory allocation request, the allocate procedure 131 uses the NumPages and BlockNumber fields to search the free list of data blocks by descending the Cartesian tree of free memory headers from the root. As the search descends the tree, at each decision point the "better fitting" branch is chosen. In other words, if the (smaller) left memory block is large enough to satisfy the allocation request, then the search continues on the left branch. If the left branch is not large enough, then the (larger) right branch is chosen to continue the search. The descent stops when both the right and left branches are too small. Upon locating the free memory block, the allocate procedure 131 allocates the rounded amount of memory words to the requester. The allocate procedure 131 then returns the address of the memory block to the requester.

The initialize procedure 132 acts as a special case of the allocate procedure 131. Upon receiving and initialize request, the initialize procedure 132 performs the same search as the allocate procedure 131, but also initializes the data space before returning the block address to the requester. For one embodiment, the initialize procedure 132 is invoked whenever the Flag input to the allocation program is set to a predetermined value.

The reallocate procedure 133 reallocates an existing data block with a new size, returning the modified data block. For one embodiment, the reallocate procedure 133 has as inputs a pointer to the memory block to resize (MemHandle) and the new size of the block, in number of pages (nPages). Upon receiving a reallocate request, the reallocate procedure 133 first checks to see if the address of the block is somewhere within the arena of allocated memory.

If the block is to be made smaller, the reallocate procedure 133 uses a shrink algorithm to decrease the block size. If the block is to be made larger, the reallocate procedure 133 first checks to see if free memory is available adjacent to the memory block. If there is no available adjacent memory, then new memory is allocated according to the allocate procedure described above and the data within the old data block is preserved. Once the new memory block has been reallocated, the reallocate procedure 133 returns the address of the newly resized block to the requester.

The free procedure 134 moves a block of memory to the free tree. The free procedure 134 uses as an input the pointer to the memory block to be added to the free tree (MemHandle). Upon receiving a free request, the free procedure 134 descends the Cartesian tree of free memory headers from the root, searching for the appropriate place to insert the free memory header for the new free block. The free procedure 134 is similar to the insert procedure explained with reference to FIG. 7 above. The free routine returns as an output a value that indicates whether or not the memory block was freed successfully.

The reclaim procedure 135 returns a data block to system memory. For one embodiment, the reclaim procedure 135 has an input that indicates a pointer to the memory block to be released to system memory (MemHandle). One example of a situation wherein the reclaim procedure 135 would be useful is where the surface for a graphics application is to be destroyed. Once the memory block has been returned to system memory, the reclaim procedure 135 returns a value to the requester indicating whether the block was released to system memory successfully or not.

One embodiment of the invention, as described herein, is implemented within a computer system using AGP and PCI interfaces. It should be appreciated that alternate embodiments may be implemented in systems in which none or only one of these interfaces is employed. The present invention, providing for memory management wherein both local graphics memory and system memory are joined in one virtual memory space, may alternatively be implemented in a computer system using other well-known bus interface protocols.

While the method and apparatus of the present invention has been described in terms of its presently preferred form, those skilled in the art will recognize that the method of the present invention is not limited to the presently preferred form described. The method and apparatus of the present invention may be practiced with modification and alteration within the spirit and scope of the appended claims. Thus, the specification is to be considered as illustrative instead of restrictive on the present invention.

APPENDIX "A"

```
char *malloc( nbytes )
unsigned integer nbytes;
{
data_block db;
free_hdr p, *flp, left_branch, right_branch;
unsigned integer left_length, right_length;
   nbytes += sizeof( unsigned integer );
   if ( nbytes < SMALLEST_BLK )
      nbytes = SMALLEST_BLK;
   else
      nbytes = roundup( nbytes, WORDSIZE );
   if ( length( _root ) <= nbytes )
      if ( !morecore( nbytes ) )
         return( 0 );
   flp = address_of(_root);
   p = *flp;
   left_branch = p->left;
   right_branch = p->right;
   left_length = length( left_branch );
   right_length = length( right_branch );
   while ( left_length >= nbytes || right_length >= nbytes ) {
      if ( left_length <= right_length ) {
         if ( left_length >= nbytes ) {
            flp = address_of(p->left);
            p = left_branch;
         }
         else {
            flp = address_of(p->right);
            p = right_branch;
         }
```

APPENDIX "A" continued

```
    }
    else {
        if ( right_length >= nbytes ) {
            flp = address_of(p->right);
            p = right_branch;
        }
        else {
            flp = address_of(p->left);
            p = left_branch;
        }
    }
    left_branch = p->left;
    right_branch = p->right;
    left_length = length( left_branch );
    right_length = length( right_branch );
}
if ( ( p->size - nbytes ) <= SMALLEST_BLK ) {
    db = p->block;
    delete( flp );
}
else {
    data_block ndb;
    db = p->block;
    ndb = nextblk( db, nbytes );
    ndb->size = p->size = ( db->size - nbytes );
    p->block = ndb;
    demote( flp );
    db->size = nbytes;
}
return( address_of(db->data) );
}
```

APPENDIX "B"

```
char *realloc( ptr, nbytes )
char *ptr;
unsigned integer nbytes;
{
free_hdr *fp, p;
data_block oldblk, freeblk, oldrelative;
unsigned integer oldsize, newsize, size, oldrelsz;

if ( ptr < _lbound || ptr > _ubound ) {
      return( 0 );
   }
   oldblk = (ptr - WORDSIZE);
   oldsize = oldblk->size;
   oldrelative = nextblk( oldblk, oldsize );
   if ( reclaim( oldblk, oldsize, 1 ) == -1 ) {
      return( 0 );
   }
   newsize = nbytes + WORDSIZE;
   if ( newsize < SMALLEST_BLK ) {
      newsize = SMALLEST_BLK;
   }
   else {
      newsize = roundup( newsize, WORDSIZE );
   }
   if ( oldsize >= newsize ) {
      return( shrink( oldblk, oldsize, newsize) );
   }
```

APPENDIX "B" continued

```
if ( oldrelative < _ubound ) {
   flp = address_of(_root);
   p = *flp;
   oldrelsz = oldrelative->size;
   while ( ((size = length( p )) >= oldrelsz ) {
      freeblk = p->block;
      if ( oldrelative < freeblk ) {
         flp = address_of(p->left);
         p = *flp;
      }
      else if ( oldrelative > freeblk ) {
         flp = address_of(p->right);
         p = *flp;
      }
      else {
         if ( oldsize + oldrelsz >= newsize ) {
            delete( flp );
            oldsize += oldrelsz;
            oldblk->size = oldsize;
            return( shrink( oldblk, oldsize, newsize ) );
         }
         else {
            break;
         }
      }
   }
}
ptr = malloc( nbytes );
if ( ptr != NULL ) {
   move( address_of(oldblk->data), ptr, oldsize );
   free( address_of(oldblk->data) );
}
return( ptr );
}
```

APPENDIX "C"

```
free( ptr )
char *ptr;
{
unsigned integer nbytes, relative_size;
free_hdr *flp, relative;
data_block relative_block, oldblk;

if ( ptr < _lbound || ptr > _ubound ) {
      return( -1 );
   }
   oldblk = address_of(ptr[ -WORDSIZE ]);
   nbytes = oldblk->size;
   flp = address_of(_root);
   relative = *flp;
   while ( relative != NIL ) {
      relative_block = relative->block;
      relative_size = relative->size;
      if ( oldblk < relative_block ) {
         data_block nblk;
         nblk = nextblk( oldblk, nbytes );
         if ( nblk == relative_block ) {
            nbytes += relative_size;
            delete( flp );
         }
         else if ( nblk > relative_block ) {
            /* error blocks overlap */
            return( -1 );
         }
         else {
            flp = address_of(relative->left);
         }
```

APPENDIX "C" continued

```
    }
    else if ( oldblk > relative_block ) {
       data_block nblk;
       nblk = nextblk( relative_block, relative_size );
       if ( nblk == oldblk ) {
          oldblk = relative_block;
          nbytes += relative_size;
          delete( fp );
       }
       else if ( nblk > oldblk ) {
          /* error block has been already freed */
          return( -1 );
       }
       else {
          fp = address_of(relative->right);
       }
    }
    else {
       /* error block has been already freed */
       return( -1 );
    }
    relative = *fp;
  }
  insert( oldblk, nbytes );
  return( 0 );
}
```

APPENDIX "D"

```
insert( newblk, len )
data_block newblk;
unsigned integer len;
{
free_header *fp,fblk,*left_ascent,*right_ascent,new_free_bdr;

fp = address_of(_root);
    fblk = *fp;
    while ( len <= length( fblk ) ) {
       if ( newblk < fblk->block )
          fp = address_of(fblk->left);
       else
          fp = address_of(fblk->right);
       fblk = *fp;
    }

*fp = new_free_bdr = getfreehdr( );
    new_free_bdr->left = new_free_bdr->right = NIL;
    new_free_bdr->block = newblk;
    new_free_bdr->size = len;
    newblk->size = len;
    left_ascent = address_of(new_free_bdr->left);
    right_ascent = address_of(new_free_bdr->right);

while ( fblk != NIL ) {
       if ( fblk->block < newblk ) {
          *left_ascent = fblk;
          left_ascent = address_of(fblk->right);
          fblk = fblk->right;
       }
```

APPENDIX "D" continued

```
    else {
       *right_ascent = fblk;
       right_ascent = address_of(fblk->left);
       fblk = fblk->left;
    }
  }

*left_ascent = *right_ascent = NIL;
  return;
}
```

APPENDIX "E"

```
int delete( p )
free_bdr *p;
{
free_bdr db, left_branch, right_branch;
unsigned integer left_length, right_length;

db = *p;
    left_branch = db->left;
    left_length = length( left_branch );
    right_branch = db->right;
    right_length = length( right_branch );

while ( left_branch != right_branch ) {
        if ( left_length >= right_length ) {
            if ( left_branch != NIL ) {
                if ( left_length == 0 ) {
                    /* error zero length block */
                    return( -1 )
                    break;
```

APPENDIX "E" continued

```
         }
         *p = left_branch;
         p = address_of(left_branch->right);
         left_branch = *p;
         left_length = length( left_branch );
      }
   }
   else {
      if ( right_branch != NIL ) {
         if ( right_length == 0 ) {
            /* error zero length block */
            return( -1 )
            break;
         }
         *p = right_branch;
         p = address_of(right_branch->left);
         right_branch = *p;
         right_length = length( right_branch );
      }
   }
}

*p = NIL;
putfreehdr( db );
return( 0 );
}
```

APPENDIX "F"

```
demote( p )
free_hdr *p;
{
free_hdr db, left_branch, right_branch;
unsigned integer left_length, right_length, db_length;

db = *p;
   db_length = length( db );
   left_branch = db->left;
   right_branch = db->right;
   left_length = length( left_branch );
   right_wlength = length( right_branch );

while ( left_length > db_length || right_length > db_length ) {
      if ( left_length >= right_length ) {
         *p = left_branch;
         p = address_of(left_branch->right);
         left_branch = *p;
         left_length = length( left_branch );
      }
      else {
         *p = right_branch;
         p = address_of(right_branch->right);
         right_branch = *p;
         right_length = length( right_branch );
      }
   }
   *p = db;
   db->left = left_branch;
   db->right = right_branch;
   return;
}
```

APPENDIX "G"

```
reclaim( oldblk, oldsize )
data_block oldblk;
unsigned integer oldsize;
{
data_block oldrelative, freeblk;
free_hdr *fp, p;
unsigned integer size;

oldrelative = nextblk( oldblk, oldsize );
   fp = address_of(_root);
   p = *fp;

while ( (size = length( p )) >= oldsize ) {
      freeblk = p->block;
      if ( oldblk == freeblk ) {
         delete( fp );
         return( 1 );
      }
      else if ( oldblk < freeblk ) {
         fp = address_of(p->left);
         p = *fp;
      }
      else {
         data_block freerelative;
```

APPENDIX "G" continued

```
      freerelative = nextblk( freeblk, freeblk->size );
      if ( oldblk >= freerelative ) {
         flp = address_of(p->right);
         p = *flp;
      }
      else {
         if ( oldrelative > freerelative ) {
            return( -1 );
         }
         else if ( oldrelative == freerelative ) {
            delete( flp );
            freeblk->size -= oldsize;
            free( address_of(freeblk->data) );
            return( 1 );
         }
         else {
            delete( flp );
            freeblk->size -= (freerelative - oldblk);
            oldrelative->size = (freerelative - oldrelative);
            free( address_of(freeblk->data) );
            free( address_of(oldrelative->data) );
            return( 1 );
         }
      }
    }
   }
  }
  return( 0 );
}
```

What is claimed is:

1. A method of allocating system memory within a computer system, comprising the steps of:
   (A) building a binary tree of free memory block headers, wherein each free memory block header includes an address field corresponding to a virtual address of a free memory block, and a translation table field pointing to an entry within a translation table, wherein each entry within said translation table corresponds to a block of said system memory; and
   (B) upon receiving an allocation request, allocating at least a part of a first of said blocks of system memory by using said binary tree of free memory block headers.

2. The method of claim 1, further comprising the steps of:
   (C) upon receiving a deallocation request, deallocating said allocated first block of system memory by inserting a free memory block header corresponding to said first block of system memory in to said binary tree of free memory block headers.

3. The method of claim 1, wherein each of said free memory block headers formed in step (A) further comprises an offset address, and wherein step (B) further comprises the step of allocating a portion of said first system memory block starting at said offset address within said system memory block.

4. The method of claim 1, wherein said address field of each of said free memory block headers corresponds to a virtual address within a continuous linear region of virtual addresses available to clients within said computer system.

5. The method of claim 4, wherein said continuous linear region of virtual addresses includes a first group of addresses corresponding to local graphics memory and a second group of addresses corresponding to entries mapped into said system memory by said translation table.

6. The method of claim 1, wherein each of said free memory block headers of said binary tree further includes a size field indicating a size of said corresponding system memory block, and wherein said free memory block headers are organized into said binary tree in accordance with said size field and said address field, said binary tree comprising a predecessor free memory block an d a descendant free memory block, wherein
   the size field of the predecessor free memory block header is greater than the size field of the descendant free memory block header,
   the address field of the predecessor free memory block header is greater than the address field of the descendant free memory block header if the descendant free memory block header is a left free memory block header, and
   the address field of the predecessor free memory block header is less than the address field of the descendant free memory block header if the descendant free memory block header is a right free memory block header.

7. The method of claim 6, wherein said predecessor free memory block header includes two descendant free memory block headers, one a left free memory block header and one a right free memory block header, and wherein allocating said block of system memory of step (B) further includes the steps of
   (B1) upon receiving said allocation request, also receiving a requested block size;
   (B2) searching the binary tree of free memory block headers starting from said predecessor free memory block header and descending to said left free memory block header if said size field of said left free memory block header is greater than or equal to said requested block size,
   (B3) if said size field of said left free memory block header is less than said requested block size, descending to said right free memory block header if said size field of said right free memory block header is greater than or equal to said requested block size; and
   (B4) allocating said system memory block corresponding to said predecessor free memory block header if said size field of said left free memory block header and said size field of said right free memory block header are both smaller than said requested block size.

8. The method of claim 1, wherein each of said entries of said translation table are 32 bits long.

9. The method of claim 1, wherein each of said blocks of system memory are 4 kilobytes long.

10. A special purpose computer system for performing the method of claim 1.

11. A method of allocating a plurality of blocks of system memory within a computer system, comprising the steps of:
    (A) building a translation table including a plurality of entries, each entry pointing to a block of said system memory;
    (B) building a free memory block binary tree including free memory block headers, each of said free memory block headers including a size field, an address field, and a translation table field, wherein said free memory block headers are organized into a binary tree in accordance with said size field and address field, said binary tree comprising a predecessor free memory block and a descendant free memory block, wherein
       the size field of the predecessor free memory block header is greater than the size field of the descendant free memory block header,
       the address field of the predecessor free memory block header is greater than the address field of the descendant free memory block header if the descendant free memory block header is a left descendant free memory block,
       the address field of the predecessor free memory block header is less than the address field of the descendant free memory block header if the descendant free memory block header is a right descendant free memory block, and
       the translation table field of each free memory block header points to an entry in the translation table corresponding to a free system memory block; and
    (C) upon receiving an allocation request, allocating at least a part of a first of said plurality of system memory blocks by using said free memory block binary tree.

12. The method of claim 11, further comprising the step of:
    (D) upon receiving a deallocation request, deallocating said first allocated system memory block by inserting a free memory block header corresponding to said first memory block in to said free memory block binary tree.

13. The method of claim 11, wherein each of said free memory block headers formed in step (B) further comprises an offset address, and wherein step (C) further comprises the step of allocating a portion of said first system memory block starting at said offset address within said system memory block.

14. The method of claim 11, wherein said address field of each of said free memory blocks corresponds to a virtual address within a continuous linear region of virtual addresses available to clients within said computer system.

15. The method of claim 14, wherein said continuous linear region of virtual addresses includes a first group of addresses corresponding to local graphics memory and a second group of addresses corresponding to entries mapped into said system memory by said translation table.

16. The method of claim 11, wherein said predecessor free memory block header includes two descendant free memory block headers, one a left free memory block header and one a right free memory block header, and wherein allocating said block of system memory of step (C) further includes the steps of (C1) upon receiving said allocation request, also receiving a requested block size;

(C2) searching the binary tree of free memory block headers starting from said predecessor free memory block header and descending to said left free memory block header if said size field of said left free memory block header is greater than or equal to said requested block size, (C3) if said size field of said left free memory block header is less than said requested block size, descending to said right free memory block header if said size field of said right free memory block header is greater than or equal to said requested block size; and (C4) allocating said system memory block corresponding to said predecessor free memory block header if said size field of said left free memory block header and said size field of said right free memory block header are both smaller than said requested block size.

17. The method of claim 11, wherein each of said entries of said translation table are 32 bits long.

18. The method of claim 11, wherein each of said blocks of system memory are 4 kilobytes long.

19. A special purpose computer system for performing the method of claim 11.

20. An apparatus for allocating system memory within a computer system, said apparatus comprising:

(A) a first storage area having a first plurality of addressable units each corresponding to a virtual address, and wherein each addressable unit is capable of storing a translation table entry, and wherein each translation table entry points to a physical address;

(B) a second storage area having a second plurality of addressable units, wherein each addressable unit has a free memory block header stored within it, and wherein each free memory block header includes an address field capable of storing one of said virtual addresses of said translation table, and a translation table field capable of storing a pointer to one of said translation table entries, and wherein said free memory block headers are logically organized as a binary tree; and (C) a system memory having a plurality of free addressable units each corresponding to one of said physical addresses within said translation table, and wherein at least a portion of each of said free addressable units are allocated according to said binary tree of free memory block headers.

21. The apparatus of claim 20, further comprising:

(C) means for receiving a deallocation request and correspondingly deallocating a first of said allocated addressable units of system memory by inserting a free memory block header corresponding to said first addressable unit of system memory in to said binary tree of free memory block headers.

22. The apparatus of claim 20, wherein each of said free memory block headers stored in said second storage area further comprises an offset field capable of storing an offset address, wherein said offset address indicates an offset from a beginning address of a corresponding addressable unit of said system memory at which allocation of said addressable unit begins.

23. The apparatus of claim 20, wherein each of said entries of said translation table are 32 bits long.

24. The apparatus of claim 20, wherein each of said addressable units of system memory are 4 kilobytes long.

25. A memory device comprising:

(A) a first storage area comprising a first plurality of addressable units, wherein a translation table entry is stored within each of said first plurality of addressable units, and wherein each entry within said translation table corresponds to a block of system memory of a computer system; and (B) a second storage area comprising a second plurality of addressable units, wherein a free memory block header is stored within each of said second plurality of addressable units, and each free memory block header includes an address field corresponding to a virtual address of a free block of said system memory of said computer system, and a translation table field pointing to one of said translation table entries, and wherein said free memory block headers are organized in a binary tree and said free blocks of said system memory are allocated according to said binary tree.

26. The memory device of claim 25, wherein each entry within said translation table is 32 bits long.

27. The memory device of claim 25, wherein each of said free blocks of system memory is 4 kilobytes long.

28. An apparatus comprising:

an execution unit that executes programming instructions; and a storage medium having stored therein a plurality of programming instructions to be executed by said execution unit, said programming instructions implementing dynamic memory management program that builds a binary tree of free memory block headers, wherein each free memory block header includes an address field corresponding to a virtual address of a free memory block, and a translation table field pointing to an entry within a translation table, wherein each entry within said translation table corresponds to a block of system memory, and allocates at least a part of a first of said blocks of system memory by using said binary tree of free memory block headers.

29. The apparatus of claim 28, wherein said storage medium further includes programming instructions to build said binary tree such that each of said free memory block headers further includes a size field indicating a size of said corresponding block of system memory, and wherein said free memory block headers are organized into said binary tree in accordance with said size field and said address field, said binary tree comprising a predecessor free memory block and a descendant free memory block, and wherein said binary tree is built such that the size field of the predecessor free memory block header is greater than the size field of the descendant free memory block header, the address field of the predecessor free memory block header is greater than the address field of the descendant free memory block header if the descendant free memory block header is a left free memory block header, and the address field of the predecessor free memory block header is less than the address field of the descendant free memory block header if the descendant free memory block header is a right free memory block header.

30. The apparatus of claim 28, wherein said storage medium further includes programming instructions to build said binary tree such that each predecessor free memory block header includes two descendant free memory block headers, one a left free memory block header and one a right free memory block header.

31. The apparatus of claim 30, wherein said storage medium further includes programming instructions to allocate said block of system memory upon receiving said allocation request coupled with a requested block size by searching the binary tree of free memory block headers starting from said predecessor free memory block header and descending to said left free memory block header if said size field of said left free memory block header is greater than or equal to said requested block size, if said size field of said left free memory block header is less than said requested block size, descending to said right free memory block header if said size field of said right free memory block header is greater than or equal to said requested block size, and allocating said system memory block corresponding to said predecessor free memory block header if said size field of said left free memory block header and said size field of said right free memory block header are both smaller than said requested block size.

\* \* \* \* \*

UNITED STATES PATENT AND TRADEMARK OFFICE
CERTIFICATE OF CORRECTION

PATENT NO. : 5,930,827
DATED : July 27, 1999
INVENTOR(S) : Sturges

It is certified that error appears in the above-identified patent and that said Letters Patent is hereby corrected as shown below:

Column 43,
Line 41, delete "an d" and insert -- and --.

Signed and Sealed this

Twenty-first Day of June, 2005

JON W. DUDAS
*Director of the United States Patent and Trademark Office*